United States Patent
Yang

(10) Patent No.: US 9,234,974 B2
(45) Date of Patent: *Jan. 12, 2016

(54) APPARATUS FOR EVALUATING ROCK PROPERTIES WHILE DRILLING USING DRILLING RIG-MOUNTED ACOUSTIC SENSORS

(75) Inventor: Yunlai Yang, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 700 days.

This patent is subject to a terminal disclaimer.

(21) Appl. No.: 13/554,298

(22) Filed: Jul. 20, 2012

(65) Prior Publication Data

US 2013/0080060 A1 Mar. 28, 2013

Related U.S. Application Data

(60) Provisional application No. 61/539,201, filed on Sep. 26, 2011.

(51) Int. Cl.
*G01V 1/40* (2006.01)
*G01V 1/30* (2006.01)
(Continued)

(52) U.S. Cl.
CPC ............... *G01V 1/306* (2013.01); *G01V 1/50* (2013.01); *E21B 44/00* (2013.01); *E21B 47/16* (2013.01)

(58) Field of Classification Search
CPC ......... E21B 44/00; E21B 47/091; E21B 7/04; E21B 7/06; E21B 47/16; G01V 1/42; G01V 1/48; G01V 1/50; G01V 1/306
USPC .................................................. 702/11, 9, 6
See application file for complete search history.

(56) References Cited

U.S. PATENT DOCUMENTS 2,155,609 A 1/1937 McClendon et al.
3,583,219 A 6/1971 Lunstroth
(Continued)

FOREIGN PATENT DOCUMENTS

EP 2236744 A2 10/2010
WO 9727502 A1 7/1997
(Continued)

OTHER PUBLICATIONS

International Search Report and Written Opinion issued in related PCT Patent Application No. PCT/US2012/057039; dated Aug. 21, 2013; 12 pages.
(Continued)

*Primary Examiner* — Sujoy Kundu
*Assistant Examiner* — Yoshihisa Ishizuka
(74) *Attorney, Agent, or Firm* — Bracewell & Giuliani LLP; Constance G. Rhebergen; Christopher L. Drymalla

(57) ABSTRACT

Apparatus for identifying rock properties in real-time during drilling, are provided. An example of an embodiment of such an apparatus includes one or more acoustic sensors positioned to detect drill sounds emanating from the drill bit and the rock encountered during drilling operations, connected to select components of a drilling rig to maximally pick up the drill sounds of the drill bit engaging rock during drilling operations. The apparatus also includes an inductive telemetry, wireless telemetry, or wired transmitting system. The apparatus also includes a computer to analyze the acoustic signals received from the acoustic sensors through the respective transmitting system for lithology type and petrophysical properties.

39 Claims, 10 Drawing Sheets

(51) Int. Cl.
*G01V 1/50* (2006.01)
*E21B 47/16* (2006.01)
*E21B 44/00* (2006.01)

(56) References Cited

U.S. PATENT DOCUMENTS

| | | | |
|---|---|---|---|
| 3,626,482 A * | 12/1971 | Quichaud et al. | 340/853.6 |
| 3,948,322 A | 4/1976 | Baker | |
| 3,980,986 A | 9/1976 | Baird et al. | |
| 4,303,994 A | 12/1981 | Tanguy | |
| 4,349,071 A | 9/1982 | Fish | |
| 4,578,675 A | 3/1986 | MacLeod | |
| 4,715,451 A * | 12/1987 | Bseisu et al. | 175/40 |
| 4,928,521 A | 5/1990 | Jardine | |
| 4,964,087 A | 10/1990 | Widrow | |
| 4,965,774 A * | 10/1990 | Ng et al. | 367/75 |
| 4,992,997 A | 2/1991 | Bseisu | |
| 5,109,925 A | 5/1992 | Stepp et al. | |
| 5,128,901 A | 7/1992 | Durmheller | |
| 5,141,061 A | 8/1992 | Henneuse | |
| 5,144,298 A | 9/1992 | Henneuse | |
| 5,159,226 A | 10/1992 | Montgomery | |
| 5,248,857 A | 9/1993 | Ollivier | |
| 5,272,925 A | 12/1993 | Henneuse et al. | |
| 5,289,354 A | 2/1994 | Clayer et al. | |
| 5,303,203 A | 4/1994 | Kingman | |
| 5,347,859 A | 9/1994 | Henneuse et al. | |
| 5,448,227 A | 9/1995 | Orban et al. | |
| 5,448,911 A | 9/1995 | Mason | |
| 5,510,582 A | 4/1996 | Birchak et al. | |
| 5,602,541 A | 2/1997 | Comeau et al. | |
| 5,678,643 A | 10/1997 | Robbins et al. | |
| 5,738,171 A | 4/1998 | Szarka | |
| 5,774,418 A | 6/1998 | Magendie et al. | |
| 5,924,499 A | 7/1999 | Birchak et al. | |
| 6,023,444 A | 2/2000 | Naville et al. | |
| 6,267,185 B1 | 7/2001 | Mougel et al. | |
| 6,320,820 B1 | 11/2001 | Gardner | |
| 6,520,257 B2 | 2/2003 | Allamon et al. | |
| 6,583,729 B1 | 6/2003 | Gardner et al. | |
| 6,648,082 B2 | 11/2003 | Schultz et al. | |
| 6,681,185 B1 | 1/2004 | Young et al. | |
| 6,681,633 B2 | 1/2004 | Schultz et al. | |
| 6,712,160 B1 | 3/2004 | Schultz et al. | |
| 6,714,138 B1 | 3/2004 | Turner et al. | |
| 6,891,481 B2 | 5/2005 | Dubinsky et al. | |
| 6,909,667 B2 | 6/2005 | Shah et al. | |
| 6,920,085 B2 | 7/2005 | Finke et al. | |
| 6,940,420 B2 | 9/2005 | Jenkins | |
| 7,036,363 B2 | 5/2006 | Yogeswaren | |
| 7,068,183 B2 | 6/2006 | Shah et al. | |
| 7,142,986 B2 | 11/2006 | Moran | |
| 7,274,992 B2 | 9/2007 | Dewhurst et al. | |
| 7,289,909 B2 | 10/2007 | Thomann et al. | |
| 7,357,197 B2 | 4/2008 | Schultz et al. | |
| 7,404,456 B2 | 7/2008 | Weaver et al. | |
| 7,480,207 B2 | 1/2009 | Marsh | |
| 7,516,015 B2 | 4/2009 | Sinha et al. | |
| 7,571,777 B2 | 8/2009 | Wylie et al. | |
| 7,590,029 B2 | 9/2009 | Tingley | |
| 7,652,951 B2 | 1/2010 | Leggett, III et al. | |
| 7,675,816 B2 | 3/2010 | Mathiszik et al. | |
| 7,735,579 B2 | 6/2010 | Gopalan et al. | |
| 7,757,759 B2 | 7/2010 | Jahn et al. | |
| 7,764,572 B2 | 7/2010 | Wu et al. | |
| 7,817,062 B1 | 10/2010 | Li et al. | |
| 7,841,425 B2 | 11/2010 | Mansure et al. | |
| 7,859,426 B2 | 12/2010 | Clark et al. | |
| 7,913,773 B2 | 3/2011 | Li et al. | |
| 7,966,874 B2 | 6/2011 | Hassan et al. | |
| 7,974,451 B2 | 7/2011 | Matsumoto | |
| 8,004,421 B2 | 8/2011 | Clark | |
| 8,281,856 B2 | 10/2012 | Jahn et al. | |
| 8,798,978 B2 | 8/2014 | Ertas et al. | |
| 2002/0096363 A1 | 7/2002 | Evans et al. | |
| 2002/0116128 A1 | 8/2002 | Sinha et al. | |
| 2002/0195276 A1 | 12/2002 | Dubinsky et al. | |
| 2003/0010495 A1 | 1/2003 | Mendez et al. | |
| 2003/0072217 A1 | 4/2003 | MacPherson | |
| 2004/0159428 A1 | 8/2004 | Hammond et al. | |
| 2004/0200613 A1 | 10/2004 | Fripp et al. | |
| 2005/0100414 A1 | 5/2005 | Salama | |
| 2006/0076161 A1 * | 4/2006 | Weaver et al. | 175/50 |
| 2006/0120217 A1 | 6/2006 | Wu | |
| 2007/0030762 A1 | 2/2007 | Huang et al. | |
| 2007/0189119 A1 | 8/2007 | Klotz et al. | |
| 2008/0056067 A1 | 3/2008 | Jogi et al. | |
| 2008/0285386 A1 | 11/2008 | Sinanovic et al. | |
| 2009/0067286 A1 | 3/2009 | Bose | |
| 2009/0195408 A1 | 8/2009 | Patterson et al. | |
| 2009/0199072 A1 | 8/2009 | Akimov et al. | |
| 2009/0201170 A1 | 8/2009 | Reckmann et al. | |
| 2009/0250225 A1 | 10/2009 | Zaeper et al. | |
| 2010/0008188 A1 | 1/2010 | Hall et al. | |
| 2010/0038135 A1 | 2/2010 | Hummes et al. | |
| 2010/0118657 A1 | 5/2010 | Trinh et al. | |
| 2010/0195442 A1 | 8/2010 | Reyes et al. | |
| 2010/0200295 A1 | 8/2010 | Schimanski et al. | |
| 2010/0268491 A1 | 10/2010 | Brink et al. | |
| 2010/0284247 A1 | 11/2010 | Manning | |
| 2010/0305864 A1 | 12/2010 | Gies | |
| 2011/0005835 A1 | 1/2011 | Li | |
| 2011/0067928 A1 | 3/2011 | Huldén et al. | |
| 2011/0073303 A1 | 3/2011 | Taherian et al. | |
| 2011/0164468 A1 | 7/2011 | Robbins et al. | |
| 2013/0075157 A1 * | 3/2013 | Yang et al. | 175/40 |
| 2013/0075159 A1 | 3/2013 | Yang | |
| 2013/0075160 A1 | 3/2013 | Yang | |
| 2013/0075161 A1 | 3/2013 | Yang | |
| 2013/0080060 A1 | 3/2013 | Yang | |
| 2013/0080065 A1 | 3/2013 | Yang | |

FOREIGN PATENT DOCUMENTS

| | | |
|---|---|---|
| WO | 2013049014 | 4/2013 |
| WO | 2013049044 | 4/2013 |
| WO | 2013049111 | 4/2013 |
| WO | 2013049124 | 4/2013 |
| WO | 2013049140 | 4/2013 |
| WO | 2013049158 | 4/2013 |

OTHER PUBLICATIONS

International Search Report and Written Opinion issued in related PCT Patent Application No. PCT/US2012/057084; dated Aug. 21, 2013; 11 pages.

Gao, DVL Technology, retrieved at http://chinada-international.com/Tech/e_index.htm on Jul. 18, 2011, 2 pages.

Gao, L., Gardner, W. and Robbins, C., Limits on Data Communication Along the Drillstring Using Acoustic Waves, Society of Petroleum Engineers, SPE Annual Technical Conference and Exhibition, Oct. 9-12, 2005, paper No. 95490-MS, Dallas, TX.

Gradi, C., Eustes, A.W. and Thonhauser, G., An Analysis of Noise Characteristics of Drill Bits, Society of Petroleum Engineers, SPE Annual Technical Conference and Exhibition, Sep. 21-24, 2008 paper No. 115987-MS, Denver, CO.

Gwilliam, W. and Radtke, R., Advanced Seismic While Drilling System, Oil & Natural Gas Projects, Exploration & Production Technologies, DE-FC26-04NT42242, Technology International, Inc., Kingwood, TX, Sep. 30, 2006.

International Search Report and Written Opinion, PCT/US2012/028994, dated Sep. 4, 2013 (14 pages).

Kristensen et al. "Characteristics of Drill Bit Generated Noise" Paper No. 1990-X, Society of Petrophysicists & Well Log Analysts, SPWLA 31st Annual Logging Symposium, 1990.

Myers, G., Goldberg, D. and Rector, J., Drill String Vibration: A Proxy For Identifying Lithologic Boundaries While Drilling, Proceeding of the Ocean Drilling Program Scientific Results (Casey and Miller), (2002), pp. 1-17, vol. 179, Palisades NY.

Nakanishi, S., Feasibility Study of Seismic-While Drilling Using Hammer Drilling Technology, Department of Exploration Geophysics, Nov. 1999.

(56) References Cited

OTHER PUBLICATIONS

Office Action for co-pending U.S. Appl. No. 13/554,470 dated Nov. 13, 2014.
Radtke et al., Advanced Seismic While Drilling System, Oil & Natural Gas Technology, Jun. 2008, 65 pages.
Schlumberger "Drillstring" retrieved at http://www.glossary.oilfield.slb.com/en/Terms/d/drillstring.aspx, 2013.
Sun, X., A Study of Acoustic Emission in Drilling Applications, American Rock Mechanics Association, The 37th U.S. Symposium on Rock Mechanics (USRMS), Jun. 7-9, 1999, paper No. 99-0983, Vail, CO.
Vardhan, H., Adhikari, G. R. and Raj, M. G., Estimating Rock Properties Using Sound Levels Produced During Drilling, International Journal of Rock Mechanics & Mining Sciences, (2009), pp. 604-612, vol. 46, Elsevier Ltd., www.elsevier.com/locate/ijrmms.
Veeningen, D., NOV-IntelliServ, USA, Describes How Broadband Network Expands Possibilities For Drilling Extend Reach Multilateral Wells, Oilfield Technology, Jun. 2009, www.oilfieldtechnology.com.
International Search Report and Written Opinion for related PCT Application No. PCT/US2012/057201 dated Sep. 25, 2013.
International Search Report and Written Opinion for related PCT Application No. PCT/US2012/057244 dated Sep. 23, 2013.
International Search Report and Written Opinion dated Aug. 7, 2013, for related PCT Application PCT/US2012/057274.
International Search Report and Written Opinion dated Aug. 7, 2013, for related PCT Application PCT/US2012/057222.
Notice of Allowance for co-pending U.S. Appl. No. 13/554,470 (SA5002) dated Mar. 2, 2015.
Office Action for co-pending U.S. Appl. No. 13/553,958 (SA5001) dated Apr. 16, 2015.
Office Action for co-pending U.S. Appl. No. 13/554,019 (SA761) dated Feb. 20, 2015.

* cited by examiner

APPARATUS FOR EVALUATING ROCK PROPERTIES WHILE DRILLING USING DRILLING RIG-MOUNTED ACOUSTIC SENSORS

RELATED APPLICATIONS

This application is a non-provisional of and claims priority to and the benefit of U.S. Provisional Patent Application No. 61/539,201, titled "Apparatus For Evaluating Rock Properties While Drilling Using Drilling Rig-Mounted Acoustic Sensors," filed on Sep. 26, 2011, and is related to U.S. patent application Ser. No. 13/554,369, filed on Jul. 20, 2012, titled "Methods of Evaluating Rock Properties While Drilling Using Downhole Acoustic Sensors and Downhole Broadband Transmitting System"; U.S. patent application Ser. No. 13/554,019, filed on Jul. 20, 2012, titled "Apparatus, Computer Readable Medium, and Program Code for Evaluating Rock Properties While Drilling Using Downhole Acoustic Sensors and Telemetry System"; U.S. patent application Ser. No. 13/553,958, filed on Jul. 20, 2012, titled "Methods of Evaluating Rock Properties While Drilling Using Downhole Acoustic Sensors and Telemetry System"; U.S. patent application Ser. No. 13/554,470, filed on Jul. 20, 2012, titled "Methods for Evaluating Rock Properties While Drilling Using Drilling Rig-Mounted Acoustic Sensors"; and U.S. patent application Ser. No. 13/554,077, filed on Jul. 20, 2012, titled "Apparatus, Computer Readable Medium, and Program Code For Evaluating Rock Properties While Drilling Using Downhole Acoustic Sensors and a Download Broadband Transmitting System"; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011, U.S. Provisional Patent Application No. 61/539,171, titled "Methods Of Evaluating Rock Properties While Drilling Using Downhole Acoustic Sensors And A Downhole Broadband Transmitting System," filed on Sep. 26, 2011; U.S. Provisional Patent Application No. 61/539,242 titled "Apparatus And Program Product For Evaluating Rock Properties While Drilling Using Downhole Acoustic Sensors And Telemetry System," filed on Sep. 26, 2011; and U.S. Provisional Patent Application No. 61/539,246 titled "Methods Of Evaluating Rock Properties While Drilling Using Downhole Acoustic Sensors And Telemetry System," filed on Sep. 26, 2011, each incorporated herein by reference in its entirety.

BACKGROUND OF THE INVENTION

1. Field of the Invention

This invention relates in general to hydrocarbon production, and more particularly, to identifying rock types and rock properties in order to improve or enhance drilling operations.

2. Description of the Related Art

Measuring rock properties during drilling in real time can provide the operator the ability to steer a drill bit in the direction of desired hydrocarbon concentrations. In current industrial practice and prior inventions, either resistivity or sonic logging while drilling (LWD) tools are employed to guide the drill bit during horizontal or lateral drilling. The center of these techniques is to calculate the locations of the boundary between the pay zone and the overlying rock (upper boundary), and the boundary between the pay zone and underlying rock at the sensors location. The drill bit is steered or maintained within the pay zone by keeping the drill string, at the sensors position, in the middle, or certain position between the upper and lower boundaries of the pay zone. The conventional borehole acoustic telemetry system, which transmits data at low rate (at about tens bit per second), is employed to transmit the measured data to surface.

Since the sensors are located 30-50 feet behind the drill bit, theses conventional LWD steering tools only provide data used in steering the drill bit 30-50 feet behind the drill bit. As the result, it is only after the 30-50 feet that the operator finds out if the selected drilling path is or is not the desired one. Therefore, these tools are not true real-time tools.

Some newer types of systems attempt to provide data at the drill bit, at real-time, while still utilizing conventional borehole telemetry systems (having a relatively slow bit rate). Such systems, for example, are described as including a downhole processor configured to provide downhole on-site processing of acoustic data to interpret the lithologic properties of the rock encountered by the drill bit through comparison of the acoustic energy generated by the drill bit during drilling with predetermined bit characteristics generated by rotating the drill bit in contact with a known rock type. The lithologic properties interpreted via the comparison are then transmitted to the surface via the conventional borehole telemetry system. Although providing data in a reduced form requiring only a bit rate speed, as such systems do not provide raw data real-time which can be used for further analysis, it is nearly impossible to construct additional interpretation models or modify any interpretation models generated by the downhole processor. Further, they require additional and potentially expensive hardware that must be positioned between the drill bit and the drill string.

Some newer types of borehole data transmitting systems utilize a dedicated electronics unit and a segmented broadband cable protected by a reinforced steel cable positioned within the drill pipe to provide a much faster communication capability. Such systems have been employed into conventional LWD tools to enhance the resolution of the logged information. However the modified tools still measures rock properties at the similar location which is 30-50 feet behind the drill bit.

Looking outside the field, some seismic signal technology includes utilization of a vibration sensor positioned on a mud swivel to pick up the seismic signal generated by drill bit drilling the rocks. It is understood, however, that such a position does not provide for sufficient reception of the pilot signal. Another form of seismic signal technology provides a dedicated coupling connector encircling the drill pipe at a location near the mud swivel to carry vibration sensors. The strength of seismic signal may be weakened due to its travelling through the connector to the vibration sensors. Besides requiring the addition of the coupling connector which comprises an annular stator/retaining ring enclosing an insulating rotor, such technology requires the signal to be transferred externally through a combination rotor-stator-brush wiper engagement methodology. Studies have demonstrated that signal accuracy is reduced by this transmission method. Both these two technologies are designed for rotary table type drill rigs which have almost been phased out by a new type of top drive drill rigs.

Accordingly, recognized by the inventor is the need for apparatus, computer readable medium, program code, and methods of identifying rock properties during operational drilling that can be used in real-time steering of the drilling bit during the operational drilling, and more particularly, apparatus specifically designed to fit top drive type drill rigs and having acoustic sensors strategically positioned on the drill rig to maximally pick up the drilling sound which is generated by drill bit biting the rocks (hereafter termed as drilling acoustic signals), a signal transmitting system to transmit signals at high accuracy, and a computer/processor positioned to receive acoustic signals from the acoustic sensors and configured to process the acoustic signals and evaluate lithology type and other petrophysical properties of the rock that is currently in contact with an operationally employed drilling bit, in real-time utilizing acoustic information contained within the acoustic signals and/or evaluated characteristics of the acoustic signals. Also recognized is the need for methods of employing the apparatus.

SUMMARY OF THE INVENTION

In view of the foregoing, various embodiments of the present invention advantageously provide apparatus, computer readable medium, program code, and methods of identifying rock properties of rock during drilling that can be used in real-time steering of the drilling bit during drilling, and more particularly, apparatus having acoustic sensors strategically positioned on a rig to maximally pick up the drilling sound, a signal transmitting system to transmit signals at high accuracy, and a computer/processor configured to evaluate a lithology type and other petrophysical properties of the rock that is currently in contact with an operationally employed drilling bit, in real-time, utilizing information contained within acoustic signals received from the acoustic sensors. Various embodiments of the present invention also provide methods of employing such apparatus.

Various embodiments of the present invention further provide apparatus including a drill bit engaging rock during drilling, a drill string and drive shaft providing media for transmitting vibrations/acoustics (acoustic signals) caused by the engagement of the drill bit with rock, acoustic sensors strategically positioned on a packing box, a rotary manifold, an upper bearing cup, or the drive shaft (depending upon the type of sensor or data interface connection used) to maximally or at least substantially maximally pick up the acoustic signals, media for transmitting/translating an amplified acoustic sensor signal, and a computer/processor positioned to receive the acoustic sensor signal and configured to identify/derive the rock type and to evaluate the properties of the rocks in real-time.

According to various embodiments of the present invention, utilizing raw acoustic sensor data, the computer can advantageously function to derive a frequency distribution of the acoustic sensor data, derive acoustic characteristics, and determine petrophysical properties of rocks. The acoustic characteristics can advantageously further be used to identify the lithology type of the rock encountered by the drill bit, to determine the formation boundary, and to determine an optimal location of the casing shoe, among other applications. According to various embodiments of the present invention, to determine petrophysical properties of the rock directly from the raw acoustic sensor data signal (generally after being converted into the frequency domain and filtered), a petrophysical properties evaluation algorithm can be derived from acoustic sensor data and correspondent petrophysical properties of formation rock samples. Further, according to various embodiments of the present invention, having the lithology type and/or petrophysical properties of presently encountered rock, the driller can steer the drill to follow the desired path more accurately than conventionally achievable.

More specifically, an example of an embodiment of an acoustic signal analyzing apparatus for identifying rock properties of rock, in real-time, during operational drilling, can include both conventional components and additional/enhanced acoustic components. Some primary conventional components of the apparatus include a drill string including a plurality of drill pipes, a drill bit connected to the downhole end of the drill string, and a drive system including a drive shaft for rotating the drill string having both rotating and stationary portions. According to an exemplary configuration of the drilling rig/drive shaft, the drive shaft includes a plurality of extensions including a packing box which rotates with the drive shaft, an upper bearing cup positioned adjacent the packing box and being stationary with respect to the drive shaft, and a rotary manifold which is stationary relative to the drive shaft during drilling.

The additional/acoustic components of the apparatus can include an acoustic signal recording and transmitting system including one or more acoustic sensors strategically positioned to detect drill sounds emanating from the drill bit and the rock encountered during drilling operations, an inductive telemetry, wireless telemetry, or wired transmitting system, and a computer to analyze the acoustic signals received from the acoustic sensors through the respective transmitting system. The acoustic sensors can include, for example, accelerometers, acoustically insulated measurement microphones or contact microphones connected to select components of a drilling rig to maximally pick up the drill sounds resulting from the drill bit engaging rock during drilling operations.

According to an exemplary configuration, such an apparatus includes an acoustic signal recording and transmitting system having one or more amplified acoustic sensors attached to the drive shaft and/or a packing box which rotates with the drive shaft and/or bearing cup located adjacent the packing box and/or a rotary manifold, and a computer to process the acoustic signals provided by the acoustic sensors. An amplified acoustic sensor is an acoustic sensor having an amplifier connected to or integral with the sensor. "Amplified acoustic sensor" is hereinafter referred to as "acoustic sensor" for the simplicity.

According to an embodiment of the acoustic signal recording and transmitting system, the transmitting system portion comprises an inductive telemetry system, which can transmit signals at high accuracy. According to a first implementation, the inductive telemetry system includes a rotating induction loop wrapped around the packing box, a stationary pickup configured to receive an acoustic signal from an acoustic sensor through an electromagnetic coupling (induction) with the rotating induction loop and to supply electric power to the acoustic sensor via the electromagnetic coupling between the induction loop and the pickup. The inductive telemetry system also includes a receiver positioned to receive the acoustic signal from the pickup and to transmit the acoustic signal/acoustic sensor data signal to a data acquisition unit, and a data acquisition unit which samples the acoustic signal and digitizes the sampled signal and then sends the digitized signal (data) to the computer. According to another implementation, one or more acoustic sensors are also or alternatively connected directly to the drive shaft or some other rotating extension of the drive shaft located between the rotary manifold and the joint between the drive shaft and the drill string, and the induction loop is wrapped around the drive shaft or an adjacent cylindrically shaped rotating component accessible to a pickup.

According to another embodiment of the transmitting system, the transmitting system comprises a wireless telemetry system, which can transmit signals at high accuracy, including a wireless transmitter connected to or integral with the acoustic sensor to define a wireless acoustic sensor. According to a first implementation, the wireless acoustic sensor is connected to the packing box or directly to the drive shaft between the rotary manifold and the joint between the drive shaft and the drill string. According to another implementation, when there is more than one wireless acoustic sensor, wireless acoustic sensors can be connected to both the packing box and the drive shaft. The wireless telemetry system also includes a wireless receiver positioned to receive an acoustic signal/acoustic sensor data signal from the wireless acoustic sensor and is configured to transmit an acoustic sensor data signal to the computer and optionally a data acquisition unit between the gateway and the computer. A data acquisition unit is generally only employed if the receiver or the transmitter of the wireless acoustic sensor does not include components which can perform the function of digitizing the acoustic signals. In this case, the data acquisition unit digitizes the acoustic signal received from the gateway and transmits the digitized form to the computer.

According to another embodiment of the transmitting system, the transmitting system comprises a wired transmitting system, which is the most accurate data transmitting method, including a first electrical or fiber-optic conductor connected between the acoustic sensor and a data acquisition unit, and a second electrical or fiber-optic conductor connected between the data acquisition unit and the computer. According to an implementation the wired configuration, the acoustic sensor is connected to the upper bearing cup located adjacent the packing box or the rotary manifold located above the remotely controlled valve. The positioning of the acoustic sensor on the upper bearing cup is generally preferred as it remains stationary. Positioning of the acoustic sensor on the rotary manifold, however, is acceptable as it generally remains stationary except during pipe deployment operations.

According to an embodiment of the apparatus, the computer includes a processor, memory in communication with the processor, and a petrophysical properties analyzing program, which can adapt the computer to perform various operations. The operations can include, for example, sending sampling commands to a data acquisition unit, receiving an acoustic data signal from the respective transmitting system, processing the acoustic sensor data signal-deriving a frequency distribution of the acoustic data contained within the acoustic sensor data signal, employing an acoustics characteristics evaluation algorithm to thereby derive acoustic characteristics from the acoustic sensor data signal (e.g., via analysis of the processed acoustic data), and employing a petrophysical properties evaluation algorithm to thereby derive petrophysical properties of rock undergoing drilling, real-time, from the acoustics data.

According to an embodiment of the apparatus, the acoustic characteristics evaluation algorithm evaluates filtered Fast Fourier Transform data for acoustic characteristics. The acoustic characteristics can include mean frequency, normalized deviation of frequency, mean amplitude, normalized deviation of amplitude, and apparent power. These characteristics can be predetermined for rock samples having a known as lithology type and/or petrophysical properties, and thus, can be used to identify lithology type and other properties by comparing such characteristics of the acoustic data received during drilling to that determined for the rock samples. According to another embodiment of the apparatus, the computer uses the derived acoustic characteristics to determine formation boundaries and/or an optimal deployment location of a casing shoe based on real-time detection of changes in the lithology type of the rock being drilled and/or petrophysical properties thereof.

According to an exemplary configuration, the petrophysical properties evaluation algorithm evaluates filtered Fast Fourier Transform data for petrophysical properties. This petrophysical property data can advantageously be applied by applications to provide drill bit steering, formation boundary determination, casing shoe position fine-tuning, etc.

According to various embodiments of the present invention, methods of identifying rock properties in real-time during drilling are also provided. For example, various embodiments of the methods include both computer employable steps (operations) as described with respect to the operations performed by the apparatus/program code, along with various non-computer implemented steps which provide substitutable replacements for the featured computer implemented steps, in conjunction with additional non-computer implemented steps as described below and/or as featured in the appended claims. Examples of various embodiments of the method are described below.

According to an embodiment of a method of identifying properties of rock in a formation in real-time during drilling, the method can include the steps of providing an acoustic signal recording and transmitting system including an acoustic sensor and a transmitting system, connecting the acoustic sensor to a drive shaft of a drill rig or an extension of the drive shaft, and operably coupling a computer to one or more components of the acoustic signal recording and transmitting system to establish communications therebetween. The steps can also include sending sampling commands to a data acquisition unit, receiving an acoustic sensor data signal from the acoustic signal recording and transmitting system, and analyzing the acoustic sensor data signal by the computer to determine, real-time, lithology type and/or one or more petrophysical properties of rock engaged by the drill bit during drilling operations. The acoustic sensor data signal represents an acoustic signal generated real-time by the acoustic sensor as a result of rotational contact of the drill bit with rock during drilling.

According to an embodiment of the method, the step of connecting the acoustic sensor includes connecting the acoustic sensor to the packing box or connecting the acoustic sensor to an outer surface of the drive shaft, for example, at a location between a rotary manifold (operably coupled to and encircling a portion of the drive shaft) and a joint connecting the drive shaft to the drill string, to maximally pick up drill sounds of the drill bit engaging rock during drilling operations. When more than one acoustic sensor is provided, a first acoustic sensor can be connected to the packing box and a second acoustic sensor can be connected to the drive shaft.

According to an embodiment of the method, the step of connecting the acoustic sensor includes connecting the acoustic sensor to an upper surface of the upper bearing cup or a lower surface of the rotary manifold to at least substantially maximally pick up drill sounds of the drill bit engaging rock during drilling operations. When more than one acoustic sensor is provided, a first acoustic sensor can be connected to the upper bearing cup and a second acoustic sensor can be connected to the rotary manifold.

According to an embodiment of the acoustic signal recording and transmitting system, the transmitting system portion comprises an inductive telemetry system, which includes a rotating induction loop encircling a portion of the packing box, a stationary pickup configured to receive an acoustic signal from the acoustic sensor through an electromagnetic coupling with the rotating induction loop and to supply electric power to the acoustic sensor via the electromagnetic coupling between the induction loop and the pickup, a receiver positioned to receive the acoustic signal from the pickup and to transmit the acoustic signal to a data acquisition unit, and a data acquisition unit which samples the acoustic signal and digitizes the sampled signal and then sends the digitized signal (data) to the computer.

According to another embodiment of an inductive telemetry system, the inductive telemetry system includes a rotating induction loop encircling a portion of the drive shaft or a cylindrically shaped rotating component adjacent to the acoustic sensor, a stationary pickup configured to receive an acoustic signal from the acoustic sensor through an electromagnetic coupling with the rotating induction loop and to supply electric power to the acoustic sensor via the electromagnetic coupling between the induction loop and the pickup, a receiver positioned to receive the acoustic signal from the pickup and to transmit the acoustic signal to a data acquisition unit, and a data acquisition unit which samples the acoustic signal and digitizes the sampled signal and then sends the digitized signal (data) to the computer.

According to another embodiment of the acoustic signal recording and transmitting system, the transmitting system portion comprises a wireless telemetry system, which includes a wireless transmitter operably connected to or integral with the acoustic sensor to thereby define a wireless acoustic sensor, a wireless gateway (receiver) configured to receive an acoustic signal from the wireless acoustic sensor and to transmit the acoustic signal or a digitized form of the acoustic signal to the computer, and optionally, a data acquisition unit between the gateway and the computer. A data acquisition unit is required only if the transmitter or the gateway does not include components which can perform the function of digitizing the acoustic signals. In this case the data acquisition unit digitizes the acoustic signal received from the gateway and transmits the digitized form to the computer.

According to another embodiment of the acoustic signal recording and transmitting system, the transmitting system portion comprises a wired transmitting system, which includes a data acquisition unit configured to sample and digitize acoustic signals received from the acoustic sensor and to send the digitized acoustic signals to the computer, and a wire extending between the acoustic sensor and the data acquisition unit, secured, for example, inside a service loop of a drill rig supporting the drive shaft.

According to an embodiment of the method, the step of analyzing can include the steps of deriving a frequency distribution from acoustic data contained within the acoustic sensor data signal, and correlating the frequency distribution of the processed acoustic sensor data signal to identify, real-time, the lithology type of rock engaged by the drill bit during drilling operations. The step of deriving a frequency distribution includes transforming the acoustic data into the frequency domain, e.g., employing a Fast Fourier Transform (FFT), and optionally filtering the transformed data.

The step of analyzing can also or alternatively include deriving a plurality of acoustic characteristics from acoustic data contained within the acoustic sensor data signal (e.g., mean frequency, normalized deviation of frequency, mean amplitude, normalized deviation of amplitude, and/or apparent power), and correlating the mean frequency, normalized deviation of frequency, mean amplitude, normalized deviation of amplitude, apparent power, or a combination thereof with acoustic characteristics of a rock sample of known lithology type and/or petrophysical properties to identify, real-time, the lithology type and/or one or more petrophysical properties of the rock engaged by the drill bit during drilling operations.

The step of analyzing can also or alternatively include deriving a petrophysical properties evaluation algorithm to predict one or more petrophysical properties of rock engaged by the drill bit during drilling operations, encoding the derived petrophysical properties evaluation algorithm in a computer program, and employing the computer program encoding the derived petrophysical properties evaluation algorithm to predict the one or more petrophysical properties of rock engaged by the drill bit during drilling operations from the acoustic data contained within the acoustic sensor data signal.

Various embodiments of the present invention advantageously supply a new approach for a much better drilling steering. Advantageously, various embodiments of the present invention provide apparatus and methods that supply detailed information about the rock that is currently in contact with the drilling bit, which can be used in real-time steering the drill bit. That is, various embodiments of the present invention provide an employable methodology of retrieving a sufficient level of information so that the driller always know the rock he is drilling, so that the drill bit can be steered to follow the desire path more accurately than conventionally achievable. In comparison with conventional drilling steering tools, the real-time data provided by various embodiments of the present invention advantageously allow the driller to drill smoother lateral or horizontal wells with better contact with the production zone, detection of formation boundaries, and detection of the fractured zones, which can advantageously result in better well production, and further analysis on raw sensor data, if necessary.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
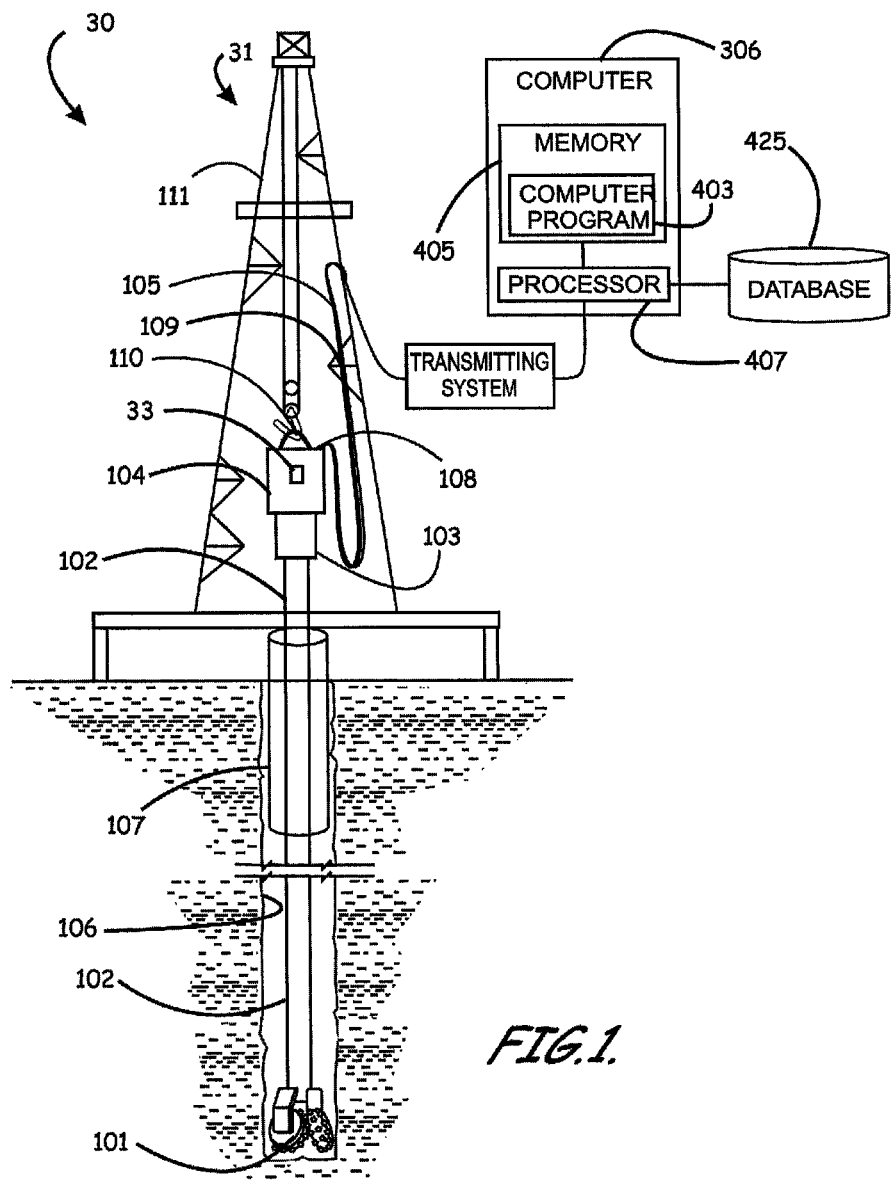
FIG. 1 is a partial perspective view and partial schematic diagram of a general architecture of an acoustic signal analyzing apparatus for identifying rock properties in real-time during drilling according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

When drilling into different lithologies or the same lithology with different properties (e.g., lithology type, porosity, water saturation, permeability, presence of fractures, etc.) the generated acoustic sounds emanating from the drill bit and contacted rock, are distinctly different. The sounds, termed as drilling acoustic signals, transmit upward along the drill string. According to various embodiments of the present invention, drilling acoustic signals transmit from the drill string to the drive shaft, to the bearings, to the connected metal parts, and are then picked up by one or more acoustic sensors attached directly to the drive shaft or an extension of the drive shaft. The drilling acoustic signals recorded by the sensors are transmitted (generally after amplification) to a computer. The lithology type and petrophysical properties of the rock under drilling are derived from the drilling acoustic signals.

According to various embodiments of the present invention, the received acoustic signals are transformed into the frequency domain using, for example, a Fast Fourier Transformation (FFT) to generate FFT data. Some acoustic characteristics can be derived directly from the FFT data. The frequency distribution and acoustic characteristics can be used immediately in some applications, such as, for example, lithology type identification and formation boundary determination. The FFT data and acoustic characteristics data can be further analyzed using a calibrated mathematical model for the lithology type and petrophysical properties, which have wider applications than the frequency distribution and acoustic characteristics.

Where other logging while drilling tools either provide a substantial delay in the time between the drilling of a rock and the provision of information, provide a reduced amount of information to the surface, or provide insufficient signal strength, various embodiments of the present invention provide a acoustic signal having sufficient signal strength and provide a complete set of raw acoustic sensor data to a surface-based computer, real-time, which can derive information about lithology type at a position located at the cutting surface of the drill bit, to correspondingly provide such information, in real time, to the operator steering the drill bit. This advantage makes aspects of various embodiments of the present invention ideal in the application of horizontal and lateral well drill steering, locating the relative position for setting the casing shoe, detecting fractured zones, and interpreting rock lithologies and petrophysical properties in real time.

Figure 2:
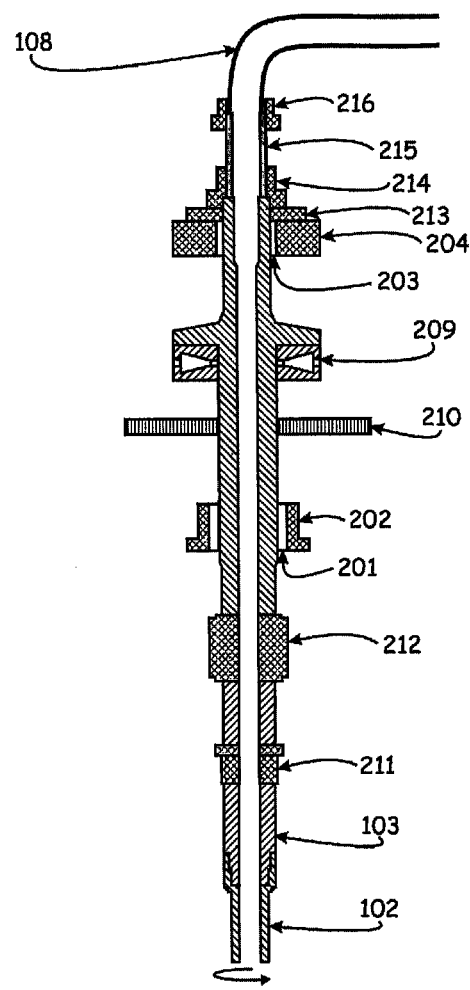
FIG. 2 is a sectional view of major components of an example of a drill rig, which are located around the drive shaft.

FIG. 1 schematically illustrates an exemplary acoustic signals analyzing apparatus 30 for identifying rock properties in real-time during drilling according one or more embodiments of the present invention, which employs an acoustic signal recording and transmitting system (described in detail below) on a top drive drill rig 31. Note, the illustrated top drive drill rig 31 is but one example of a drill rig that can be modified to employ one or more embodiments of the acoustic signals analyzing apparatus 30. Other drilling systems having a drive shaft can be utilized. Further, described below, are various embodiments of an acoustic signal recording system. FIG. 2 shows a generic top drive 104 according to an embodiment of the drilling rig 31 shown in FIG. 1, illustrating the major components around the drive shaft 103. FIGS. 3-7 illustrate various transmitting system type-dependent acoustic sensor modifications to the top drive 104 positioned to maximally pick up the drill sounds of the drill bit 101 engaging rock during drilling operations.

Referring to FIGS. 3-7, as the acoustic sensors 33 (in FIG. 1) of the acoustic signals recording and transmitting systems, as described herein, are positioned in strategic locations on the upper portion of the selected drill rig (e.g., top drive drill rig 31 in this example), a brief description of major parts of the drill rig 31 are described.

Referring again to FIG. 1, for a top drive drill rig 31, the top drive 104 is the central component of the rig 31. The top drive 104 is suspended in the derrick 111 by a traveling block 110. In the center of the top drive 104, there is a drive shaft 103 which is connected to the top pipe of the drill string 102 by threads. The drill string 102 runs through a conductor pipe 107. The top drive 104 rotates the drive shaft 103, therefore the drill string 102 and the drill bit 101 to cut the rock at the bottom of the borehole 106. The power cable supplying electric power to the top drive 104 is protected inside service loops 105. Drilling mud is pumped into the borehole through a mud line 109, a goose neck 108, the drive shaft 103, and the drill string 102.

FIG. 2 shows a generic top drive 104 for an embodiment of the drilling rig 31 shown in FIG. 1, illustrating the major components around the drive shaft 103. As the drilling acoustic signals are recorded or otherwise intercepted on the drive shaft 103 or an extension of the drive shaft 103, according to various embodiments of the present invention, the major component around the drive shaft 103 are briefly introduced to help to understand the system setup.

According to the illustrated embodiment of the top drive 104 for the embodiment of a drilling rig 31 shown in FIG. 1, the drive shaft 103 and the major components around it are suspended by the traveling block 110 (see FIG. 1) through a thrust bearing 209. The drive shaft 103 is a typically metal tube between a washpipe 215 and the drill string 102. The drive shaft is kept vertical by a lower bearing 201, a rotary manifold 202, an upper bearing 203, and a bearing cup 204. The rotary manifold 202 is stationary relative to the drive shaft 103 during drilling. It does, however, rotate when making up pipes, breaking out pipes, or drill string tripping in and out of the borehole, the operations during which the drilling is suspended, and thus, continuous identification of lithology type and/or rock properties through the acoustic system/apparatus would not be necessary. In contrast, the upper bearing cup 204 is stationary all the time.

The drive shaft 103 is rotated by a motor (not shown) through a gear transmission system, in which a large gear 210 is connected to a medial portion of the drive shaft 103. At the bottom of the drive shaft 103, the upmost piece of pipe of the drill string 102 threads therein. The motor thus rotates the drill string 102 and the drill bit 101 (FIG. 1) through rotation of the drive shaft 103. At the top, the drive shaft 103 is connected to a washpipe 215 by a rotatable packing box 214 which seals the connection between the drive shaft 103 and the washpipe 215. The packing box 214 is screwed on the top of the drive shaft 103 and rotates together with the drive shaft 103. A stationary seal 213 is located below the packing box 214. A holding nut 216 connects the washpipe 215 to the goose neck 108. A manual valve 211 and a remotely controlled valve 212 (also known as Lower Well Control Valve, LWCV) are provided to control blow out.

Figure 3:
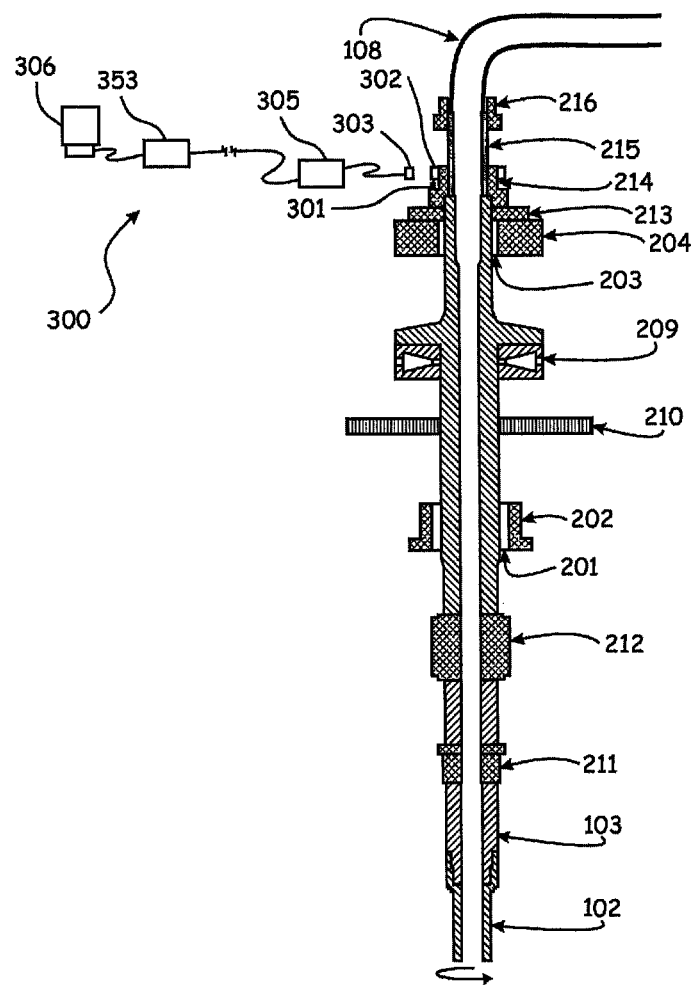
FIG. 3 is a part sectional view and part schematic diagram illustrating major components of an inductive telemetry system according to an embodiment of the present invention.
Figure 4:
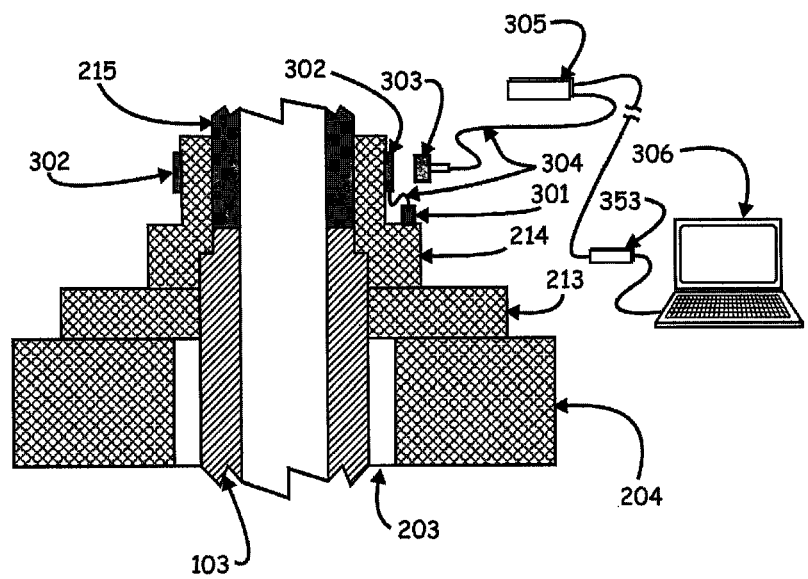
FIG. 4 is a part schematic diagram and part sectional view of a portion of an inductive telemetry system according to an embodiment of the present invention.
Figure 5:
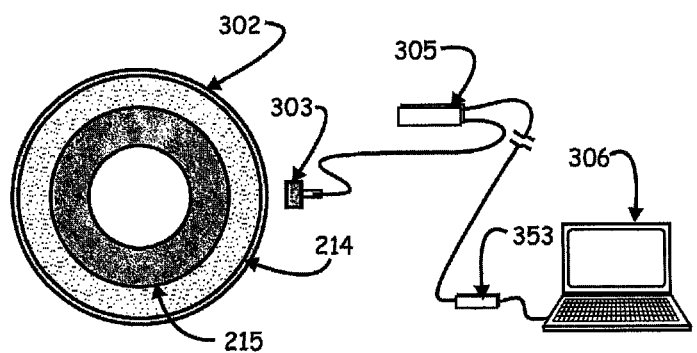
FIG. 5 is a plane view of the portion of the inductive telemetry system and part schematic diagram according to an embodiment of the present invention.

FIGS. 3-5 illustrate the major components of an acoustic signal recording and transmitting system 300 interfaced with components of a top drive drill rig 31 (FIG. 1) according to an embodiment of the present invention. According to an exemplary configuration, one or more acoustic sensors 301 are attached to the packing box 214, which is screwed on top of the drive shaft 103 and rotates with the drive shaft 103. Although a plurality of acoustic sensors 301 are typically employed, for illustrative purposes only a single acoustic sensor 301 is shown in the figure. Acoustic sensor 301 rotates together with the drive shaft 103. An amplifier is either built-in or is connected to the acoustic sensor 301. The received acoustic signals are amplified first before transmission.

According to the exemplary configuration, the acoustic signal recording and transmitting system 300 comprises an inductive telemetry system, which includes, for example, an induction loop 302, a pickup 303 used to transmit the acoustic sensor signal from the acoustic sensor 301 to a receiver, a receiver 305 that transmits acoustic sensor data to a data acquisition unit 353, and the data acquisition unit 353, which samples the acoustic signal and digitizes the sampled signal and then sends the digitized signal (data) to a computer 306. The induction loop 302, in conjunction with pickup 303, can also serve to supply electric power to the acoustic sensor 301. Electric power is supplied by electromagnetic coupling between the induction loop 302 and the pickup 303 as will be understood by one of ordinary skill in the art. Note, in the exemplary configuration, the length of cable/wire between the pickup 303 and receiver 305 is generally limited to keep the maintain of the acoustic signals at a perceptible level. At receiver 305, the signals can be amplified and then transmitted over a long distance to the data acquisition unit 353.

According to the configuration shown in FIGS. 3 and 4, the induction loop 302 is wrapped around the packing box 214 and rotates together with the packing box 214. The acoustic sensor 301 is connected the induction loop 302 by electronic wire 304. The pickup 303, which provides a stationary interface between the stationary receiver 305 and the rotating induction loop 302, is correspondingly not attached to the packing box 204 and it does not rotate. The connection (e.g., electronic wire) between the receiver 305 and the data acquisition unit 353 is protected inside the service loop 105 (FIG. 1).

Note, although attachment of the acoustic sensor 301 to the packing box 214 can enhance ease of installation and can provide a location to maximally pick up the drill sounds of the drill bit 101 engaging rock during drilling operations, the acoustic sensor 301 and the corresponding components of the inductive telemetry system may be installed at other locations that provide at least a near maximal pick up of the drill sounds of the drill bit 101 engaging rock during drilling operations. This can generally be accomplished as long as the acoustic sensor or sensors 301 are attached directly to the drive shaft 103 or to a direct extension of the drive shaft 103 at a location where the induction loop 302 can be wrapped around the drive shaft 103 or drive shaft extension and be connected to the sensors 301 at a position adjacent thereto. Note also, although different types of acoustic sensors 301 may be used, such as, for example, accelerometers, measurement microphones, contact microphones, etc., when microphones are used to receive/record the acoustic signals from the drill bit 101 transmitting through the drilling string 102 and the drive shaft 103, they should be acoustically insulated with good insulating material to block the ambient noise emanating from nearby components of the drilling rig 31. As such, accelerometers have been found to provide the best ease of installation. Additionally, microphones tend to have a higher high-frequency attenuation than that of accelerometers.

In operation, when the drilling acoustic signals are generated at the drill bit 101, they transmit upward through the drill string 102, drive shaft 103 and then the packing box 214. They are picked up by the acoustic sensors 301 attached directly to the packing box 214. The drilling acoustic signals picked up by the acoustic sensor 301 are amplified. The amplified acoustic signals are transmitted to the induction loop 302. From there, they are transmitted to the pickup 303 by induction. The acoustic signals are then transmitted from the pickup 303 to the receiver 305 through an electronic wire 304. The received signals are transmitted to a data acquisition unit 353, via an electronic wire, which samples the acoustic signal and digitizes the sampled signal and then transmits the digitized signal (data) to a computer 306. As will be described in more detail later, the digitized acoustic signals received by the computer 306 are first transformed into frequency domain by using Fourier transformation. The frequency distribution data are further evaluated for acoustic characteristics. The frequency distribution, and/or characteristics of the acoustic signals may then be used to identify lithology and to evaluate petrophysical properties of the rock under drilling in real time, as described later.

Figure 6:
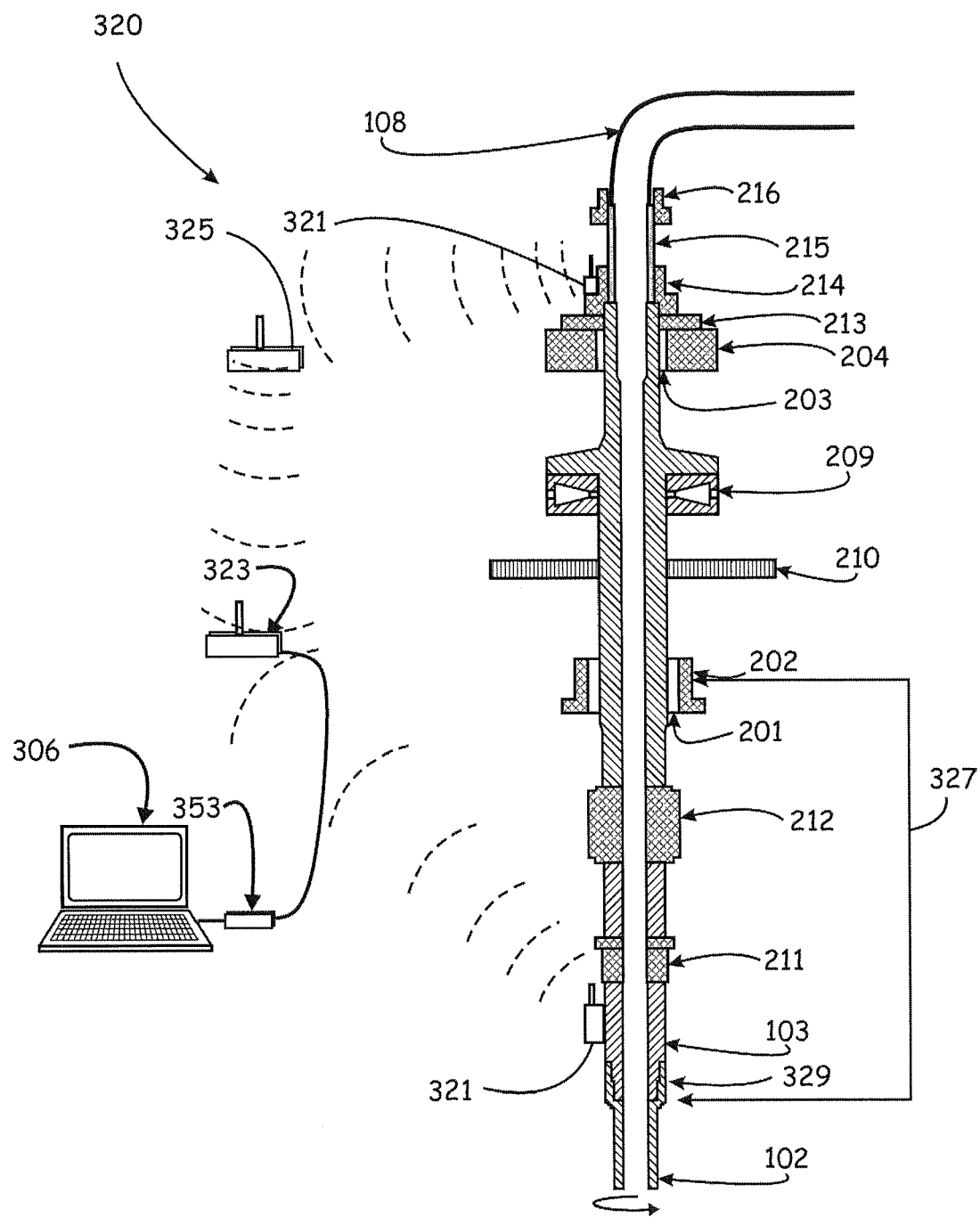
FIG. 6 is a part sectional view and part schematic diagram illustrating major components of a wireless telemetry system according to an embodiment of the present invention.

FIG. 6 illustrates the major components of an acoustic signal recording and transmitting system 320 interfaced with components of a top drive drill rig 31 (FIG. 1) according to another embodiment of the present invention. According to an exemplary configuration, a wireless acoustic sensor 321 is attached to the drive shaft 103 and to the packing box 214, respectively, and rotates together with the drive shaft 103. Although multiple acoustic sensors are typically employed, for illustrative purposes, only two separately positioned acoustic sensors 321 are shown in the figure. Note, different types of acoustic sensors 321 may be used such as, for example, accelerometers, measurement microphones, contact microphones, etc. Accelerometers, however, have been found to function the best as they have less high-frequency attenuation and are less affected by ambient noise then other types of acoustic sensors, thus reducing installation requirements. When microphones are used to pick up the acoustic signals, for example, they generally need to, or at least should, be acoustically insulated with good insulating material to block the noise from drilling rig 31.

According to an exemplary configuration, each acoustic sensor 321 includes or is connected to a wireless transmitter. Between the sensor and the wireless transmitter, there is a signal amplifier, which could be either a built-in type or a separate unit. The acoustic sensor, amplifier, and wireless transmitter are collectively termed as "wireless acoustic sensor" arranged as one unit, separate units, or a combination thereof.

According to the exemplary configuration, the acoustic signal recording and transmitting system 320 comprises a wireless telemetry system, which includes, for example, the wireless acoustic sensors 321, a gateway or other appropriate type of receiver 323, and optionally a data acquisition unit 353. The wireless telemetry system can also include one or more repeaters 325, if needed, positioned between the wireless acoustic sensors 321 and the receiver unit 323 to relay the data from the acoustic sensors 321 if the distance between the wireless acoustic sensors 321 and the receiver unit 323 exceeds the maximum specified distance and/or to improve signal strength.

According to the configuration shown in FIG. 6, one or more wireless acoustic sensors 321 are attached to the packing box 214 to maximally pick up the drill sounds of the drill bit 101 engaging rock during drilling operations. Also or alternatively, one or more wireless sensors are attached to the drive shaft 103. When wireless acoustic sensors 321 are attached to the drive shaft 103 in the drill rig 31 having the exemplary configuration, the only available location found to provide at least substantially maximum pick up of the drill sounds of the drill bit 101 engaging rock during drilling operations with an acceptable level of ambient noise, is the location 327 between the rotary manifold 202 and the joint 329 between the drive shaft 103 and the drill string 102. FIG. 6 shows a convenient location just below the remotely controlled valve 212 for the wireless acoustic sensors 321.

In operation, when the drilling acoustic signals are generated at the drill bit 101, they transmit upward through the drill string 102 and then drive shaft 103, and are picked up by the wireless acoustic sensors 321 attached directly to the drive shaft 103 and/or the packing box 214. The drilling acoustic signals picked by the wireless acoustic sensors 321 are digitized by the wireless acoustic sensors 321 before they are transmitted to the receiving unit 323 if there is a built-in or external data acquisition unit in or coupled to the wireless acoustic sensor 321, or the drilling acoustic signals are digitized by a built-in or external data acquisition unit in the receiving unit 323 before they are transmitted to the computer 306 through an electrical or optical cable. The digitized acoustic signals (data) transmitted to the computer 306 are first transformed into the frequency domain by using Fourier transformation. The frequency distribution data are further evaluated for acoustic characteristics. The frequency distribution, and/or characteristics of the acoustic signals may then be used to identify lithology and to evaluate petrophysical properties of the rock under drilling in real time, as described later.

Figure 7:
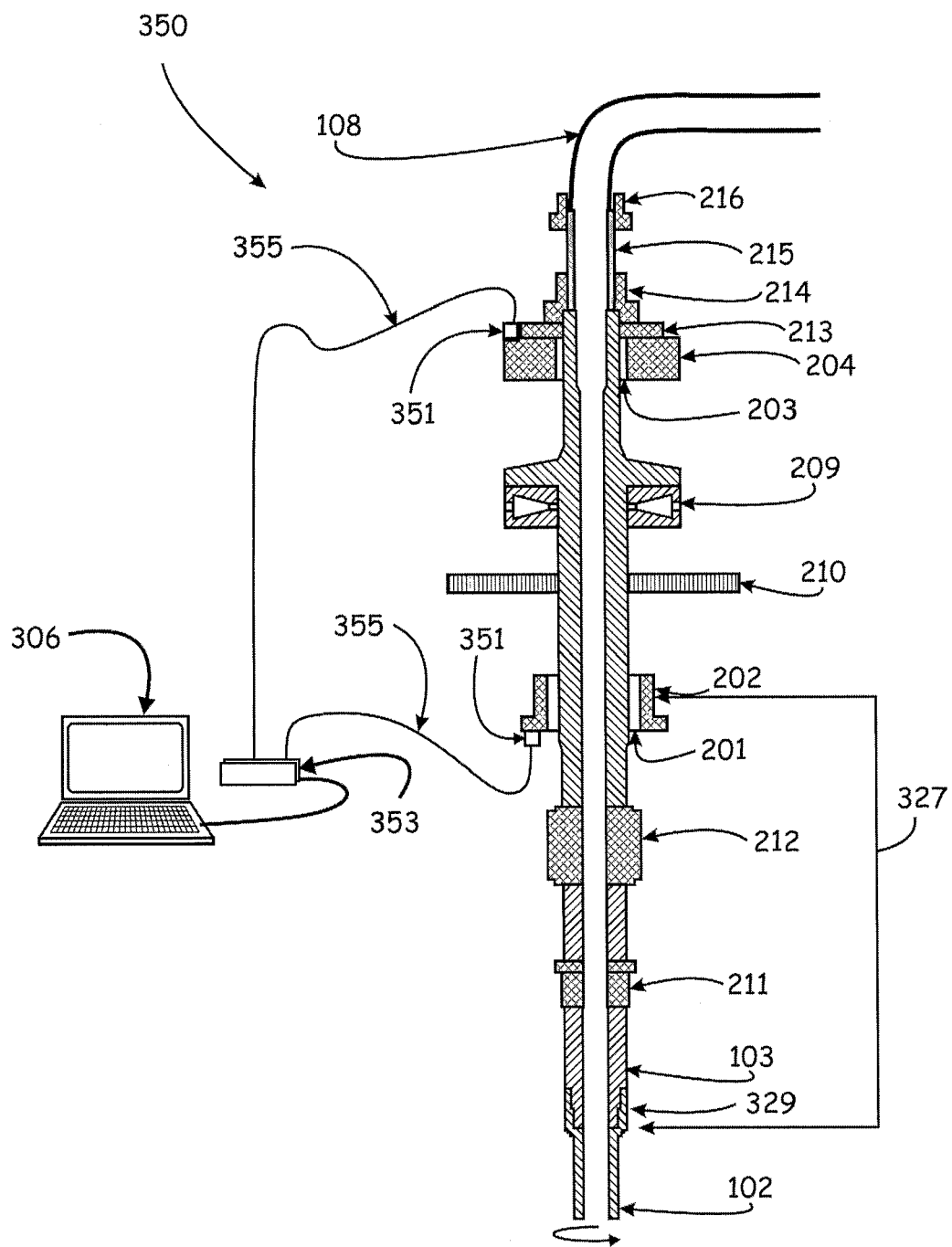
FIG. 7 is a part sectional view and part schematic diagram illustrating major components of a wired transmitting system according to an embodiment of the present invention.

FIG. 7 illustrates the major components of an acoustic signal recording and transmitting system 350 interfaced with components of a top drive drill rig 31 (FIG. 1) according to another embodiment of the present invention. According to an exemplary configuration, one or more acoustic sensors 351 are attached to metal parts which are in close, good contact with drive shaft 103, for example, through bearings for maximally picking up the drill sound.

According to an exemplary configuration, the acoustic signal recording and transmitting system 350 comprises wired transmitting system, which includes, for example, a data acquisition unit 353 and an electrical wire or other conductor 355 connected to each acoustic sensor 351 and to the data acquisition unit 353. The electronic wires 355 extending between the acoustic sensors 351 and the data acquisition unit 353 may be arranged and secured inside the service loop 105. Further, an amplifier is either built-in or is connected to each acoustic sensor 351. The received acoustic signals are amplified first before transmission.

As the rotary manifold 202 and the upper bearing cup 204 are in close, good contact with drive shaft 103 through bearings, according to an exemplary configuration, one or more sets of acoustic sensors 351 are attached on either of them to at least substantially maximally pick the drilling acoustic signals. As the upper bearing cup 204 stays stationary all the time, however, it is more management-wise and installation-wise convenient to connect the one or more sets of the acoustic sensors 321 to the upper bearing cup 204.

Note, although a plurality of acoustic sensors 351 are typically employed in each location, for illustrative purposes, only a single acoustic sensor 351 at each location is shown in the figure. Note also, although different types of acoustic sensors 351 may be used such as, for example, accelerometers, measurement microphones, contact microphones, etc., accelerometers have been found to function the best as they have less high-frequency attenuation and are less affected by ambient noise then other types of acoustic sensors, thus reducing installation requirements. When microphones are used to pick up the acoustic signals, for example, they generally need to or at least should be acoustically insulated with good insulating material to block the noise from drilling rig 31.

In operation, when the drilling acoustic signals are generated at the drill bit 101, they transmit upward through the drill string 102 and then drive shaft 103. Since the rotary manifold 202 and the upper bearing cup 204 are in close, good contact with the drive shaft 103 through bearings, the drilling acoustic signals can be picked up at least near maximally at these two locations by the acoustic sensors 351. The drilling acoustic signals picked up by the acoustic sensors 351, after being amplified, are sent through electronic wires 355 to the data acquisition unit 353. The acoustic signals are digitized by the data acquisition unit 353 and then sent to the computer 306 for analysis. The digitized acoustic signals are first transformed into frequency domain by using Fourier transformation. The frequency distribution data are further evaluated for acoustic characteristics. The frequency distribution, and/or characteristics of the acoustic signals may then be used to identify lithology and to evaluate petrophysical properties of the rock under drilling in real time, as described below.

Figure 8:
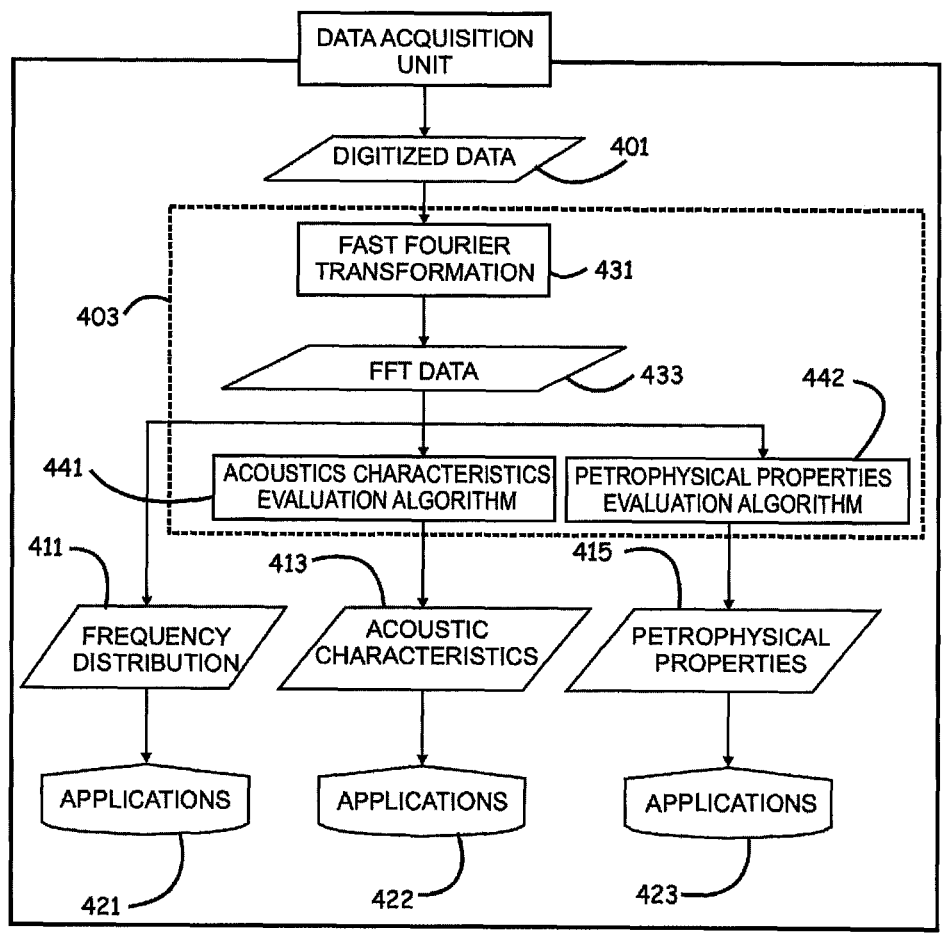
FIG. 8 is a schematic diagram illustrating major components and functions of a computer program/program code according to an embodiment of the present invention.

Referring to FIG. 8, digitized data 401, digitized by a data acquisition unit associated with receiver 305, wireless acoustic sensor 321, receiver 323, or convertor 353, depending upon the transmitting system implementation, is read by a computer program 403 (e.g., a petrophysical properties analyzing program), stored in memory 405 (see FIG. 1) accessible to processor 407 of computer 306. The computer program 403 analyzes the digitized data 401 to derive a frequency distribution 411, acoustic characteristics 413, and petrophysical properties 415 of the rock undergoing drilling. The respective results, e.g., frequency distribution 411, acoustic characteristics 413, and petrophysical properties 415, can be used in various applications 421, 422, 423, to include lithology identification, drill bit steering, formation boundary identification, among others. Such data along with rock sample data, rock modeling data, etc. can be stored in database 425 stored in either internal memory 405 or an external memory accessible to processor 407.

Note; the computer 306 can be in the form of a personal computer or in the form of a server or server farm serving multiple user interfaces or other configurations known to those skilled in the art. Note, the computer program 403 can be in the form of microcode, programs, routines, and symbolic languages that provide a specific set or sets of ordered operations that control the functioning of the hardware and direct its operation, as known and understood by those skilled in the art. Note also, the computer program 403, according to an embodiment of the present invention, need not reside in its entirety in volatile memory, but can be selectively loaded, as necessary, according to various methodologies as known and understood by those skilled in the art. Still further, at least portions of the computer program 403 can be stored in memory of the sensor subassembly 33 (FIG. 1) when so configured.

Figures 9A, 9B:
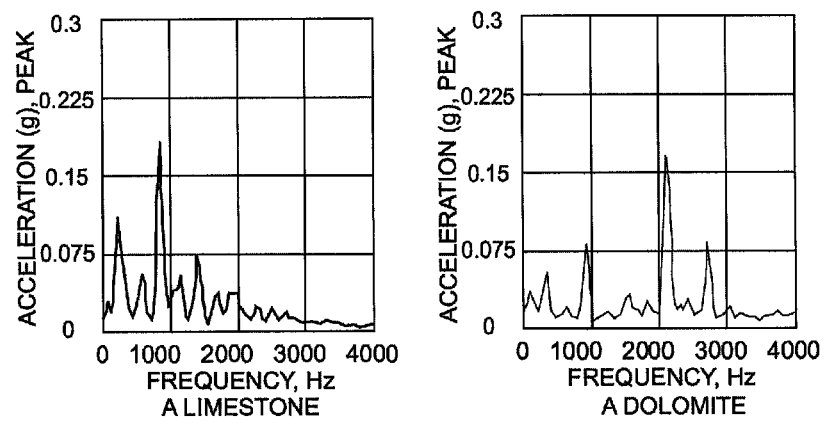
FIGS. 9A-9B are graphs illustrating examples of a frequency distribution of two types of limestone produced according to an embodiment of the present invention.

As illustrated in the figure, the digitized data 401 is transformed into Fast Fourier Transform (FFT) data 433 by a Fast Fourier Transformation 431. The FFT data 433, typically filtered by a filter (not shown) to remove some low/high frequency and/or low amplitude data points, generated from other sources, i.e. not from the bit cutting into the rocks. The main part of the filtered FFT data 431 is a frequency distribution 411, which is the frequency and amplitude information of a sampled acoustic signal. Two examples of such signal are shown in FIGS. 9A and 9B. FIG. 9A illustrates the frequency distribution for a limestone and FIG. 9B illustrates the frequency distribution for a dolomite. A review of the frequency distribution of the two different types of carbonate illustrates how the frequency distribution can be used directly to distinguish lithologies.

Figure 10:
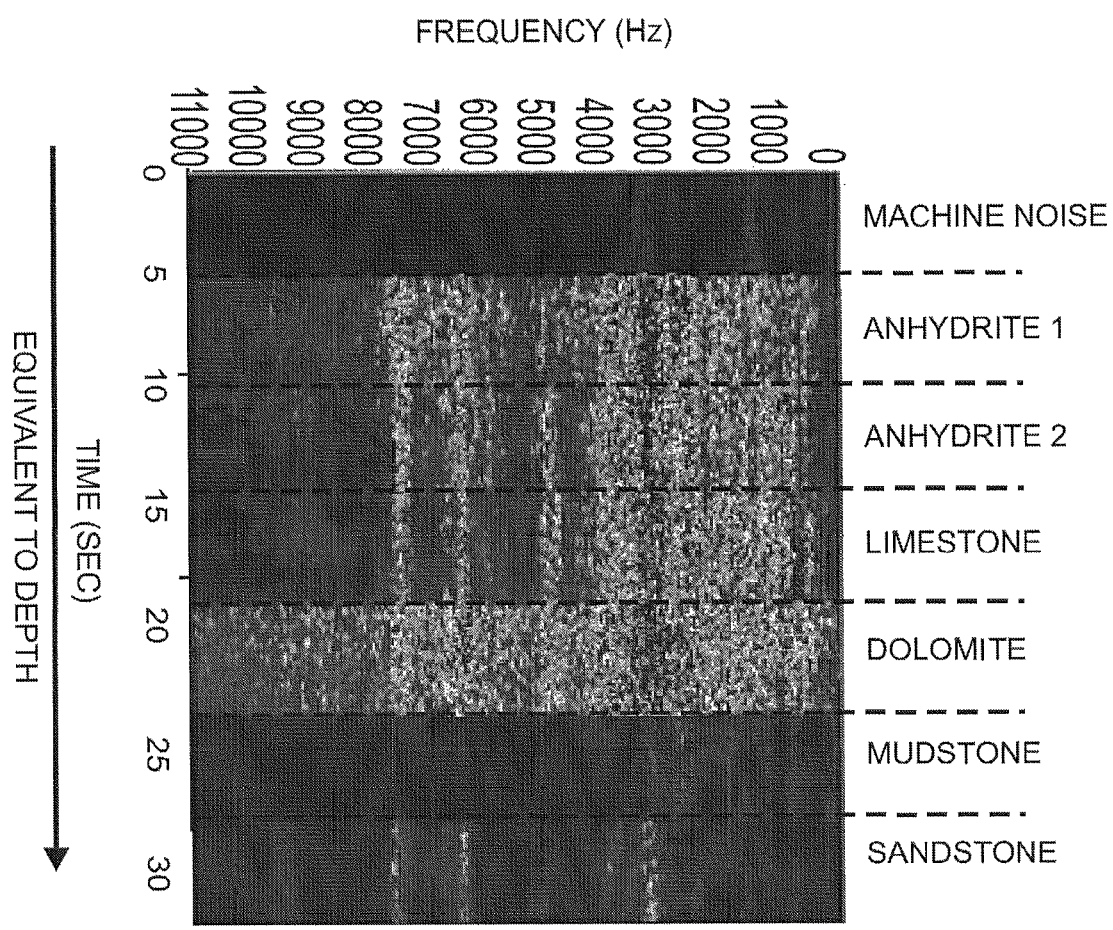
FIG. 10 is a graph illustrating a three dimensional depiction of the frequency distribution in correlation with various lithology types according to an embodiment of the present invention.

The filtered FFT data 433 is used either directly in some applications 421, such as lithology type identification, formation boundaries determination, etc., represented by example at 421. An example of such signal displaying diagram is shown in FIG. 10, which illustrates results of a laboratory experiment showing different lithologies have different time-frequency spectrums and lithology boundaries can be determined using the diagram. In FIG. 10, the color represents amplitude, with color normally displayed as red being highest (the intermixed color mostly concentrated just below the 4000 Hz range in this example) and the color normally displayed as blue being the lowest (the more washed out color in this example).

Also or alternatively, the filtered FFT data 431 is further processed by an acoustic characteristics evaluation algorithm 441 and/or petrophysical properties evaluation algorithm 442. According to the exemplary configuration, an acoustic characteristics evaluation algorithm 441 is employed to evaluate the filtered FFT data 433 for select acoustic characteristics 413, such as, for example, mean frequency, normalized deviation of frequency, mean amplitude, normalized deviation of amplitude, apparent power. These acoustic characteristics for an acoustic signal sample are defined as follows:

$$u_f = \frac{\sum_{i=1}^{n} A_i \cdot f_i}{\sum_{i=1}^{n} A_i} \quad (1)$$

$$\sigma_{f\_N} = \frac{1}{\mu_f} \sqrt{\sum_{i=1}^{n} \frac{A_i}{\sum_{i=1}^{n} A_i} (f_i - \mu_f)^2} \quad (2)$$

$$\mu_A = \frac{1}{n} \sum_{i=1}^{n} A_i \quad (3)$$

$$\sigma_{A\_N} = \frac{1}{\mu_A} \sqrt{\frac{1}{n} \sum_{i=1}^{n} (A_i - \mu_A)^2} \quad (4)$$

$$P_a = \sum_{i=1}^{n} A_i^2 f_i^2 \quad (5)$$

wherein:
$\mu_f$—mean frequency, Hz,
$\sigma_{f\_N}$—normalized deviation of frequency, Hz,
$\mu_A$—mean amplitude, the unit depending on the type of acoustic sensor used in the measurement,
$\sigma_{A\_N}$—normalized deviation of amplitude, the unit depending on the type of acoustic sensor used in the measurement,
$P_a$—apparent power, the unit depending on the type of acoustic sensor used in the measurement,
$f_i$—frequency of the $i^{th}$ point of the acoustic signal sample, Hz,
$A_i$—amplitude of the $i^{th}$ point of the acoustic signal sample, the unit depending on the type of acoustic sensor used in the measurement, and
n—number of data points of the acoustic signal sample.

The mean frequency and the normalized deviation of frequency characterize the frequency distribution, while the mean amplitude and the normalized deviation of amplitude characterize the loudness level of the drilling sound. Apparent power represents the power of the acoustic signals. In the evaluation, these characteristics can be calculated within the whole range or a partial range of the frequency of the acoustic samples. The range is selected to achieve the maximum difference of these characteristics among different lithologies.

Figure 11:
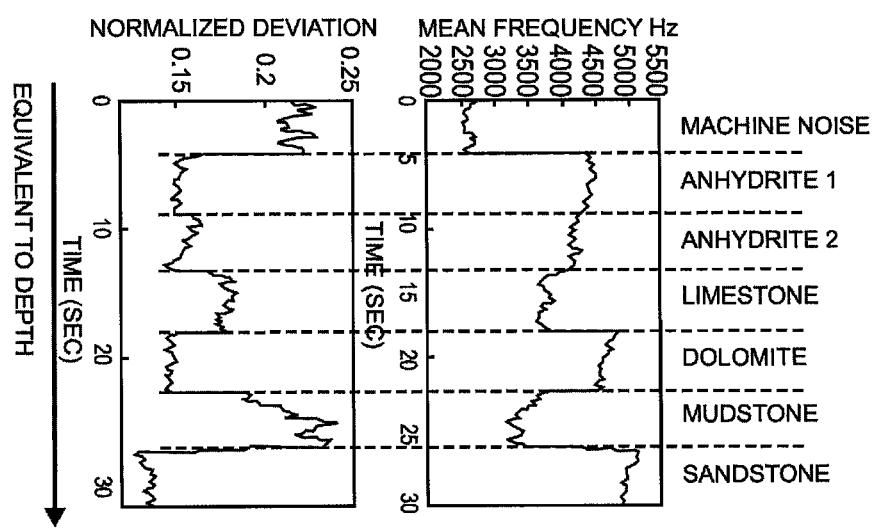
FIG. 11 is a graph illustrating a comparison of mean frequency and normalized deviation of frequency correlated with a plurality of lithology types according to an embodiment of the present invention.

The derived acoustic characteristics 413 can be used directly for certain applications, such as lithology type identification, formation boundary determination represented by example at 422. FIG. 11 illustrates results of a laboratory experiment showing that the mean frequency and normalized deviation of frequency correlated well with different lithology types. Accordingly, a comparison of the acoustic characteristics 413 to those of a sample having known acoustic characteristics can yield a lithology identification of the rock presently encountered by the drill bit 101, real-time, during drilling operations.

According to the exemplary configuration, an either bit-specific or bit-independent petrophysical properties evaluation algorithm 442 can be employed to evaluate the filtered FFT data 433 to determine petrophysical properties 415 of the rock undergoing drilling. U.S. patent application Ser. No. 13/554,077, filed on Jul. 20, 2012, titled "Apparatus, Computer Readable Medium, and Program Code for Evaluating Rock Properties While Drilling Using Downhole Acoustic Sensors and a Downhole Broadband Transmitting System," and U.S. patent application Ser. No. 13/554,369, filed on Jul. 20, 2012, titled "Methods of Evaluating Rock Properties While Drilling Using Downhole Acoustic Sensors and a Downhole Broadband Transmitting System," each incorporated herein by reference in its entirety, collectively describe apparatus for and methods of building the petrophysical properties evaluation algorithm 442 for both a specific drill bit 101 and a drill bit independent scenario.

Application of the Results from the Processed Acoustic Signal.

One direct result is the frequency distribution 411 (FIG. 8), which may be used directly in lithology type identification, formation boundary determination, etc. FIGS. 9A and 9B, for example, show the unique frequency distribution of two different types of carbonates. Further, FIG. 10 illustrates a three dimensional depiction of the frequency distribution in correlation with various lithology types. The figures illustrate that the frequency distribution can be used in the lithology type identification from matching a detected/determined frequency distribution with a frequency distribution provided by a core sample or other rock sample of known lithology type.

FIG. 11 demonstrates the feasibility of using acoustic characteristics 413 (FIG. 8) to derive lithology information/identification. For example, as described above, mean frequency and normalized deviation of frequency can be calculated from FFT data of the drilling sounds of rock encountered during drilling operations. The figure demonstrates how the lithology types can be distinguished by the combination of the two characteristics: mean frequency and the normalized deviation of frequency. If mean amplitude, normalized deviation of the amplitude, and apparent power are also used, an even better result may be achieved. The figure also inherently demonstrates that formation boundaries can be determined from acoustic characteristics.

Further, the above identified U.S. patent application Ser. No. 13/554,077, titled "Apparatus, Computer Readable Medium, and Program Code for Evaluating Rock Properties While Drilling Using Downhole Acoustic Sensors and a Downhole Broadband Transmitting System," demonstrates the feasibility of building a petrophysical properties evaluation algorithm 442, which can be used to evaluate processed forms of the sound generated by operationally engaging the drilling bit 101 with the rock being drilled.

Various embodiments of the present invention provide several advantages. For example, various embodiments of the present invention beneficially provide a means to identify lithology type and physical properties, truly in real-time, using the drive shaft/drive shaft extension-mounted acoustic sensors. This advantage makes various embodiments of the present invention ideal in the applications of (1) horizontal and lateral well drill steering and (2) locating the relative position for setting the casing shoe at a much higher precision. Various embodiments can also be used to (3) detect fractured zones; and (4) interpret rock lithologies and petrophysical properties. Various embodiments of the present invention beneficially supply additional information for evaluating petrophysical properties of the rocks, such as porosity, strength, and presence of hydrocarbons, besides conventional logs, through the utilization of data obtained through the analysis of acoustic signals to evaluate these petrophysical properties. Such data can beneficially be beyond that which can be conventionally supplied real-time, particularly without the use of a LWD tool.

This application is a non-provisional of and claims priority to and the benefit of U.S. Provisional Patent Application No. 61/539,201, titled "Apparatus For Evaluating Rock Properties While Drilling Using Drilling Rig-Mounted Acoustic Sensors," filed on Sep. 26, 2011, and is related to U.S. patent application Ser. No. 13/554,369, filed on Jul. 20, 2012, titled "Methods of Evaluating Rock Properties While Drilling Using Downhole Acoustic Sensors and a Downhole Broadband Transmitting System"; U.S. patent application Ser. No. 13/554,019, filed on Jul. 20, 2012, titled "Apparatus, Computer Readable Medium, and Program Code for Evaluating Rock Properties While Drilling Using Downhole Acoustic Sensors and a Downhole Telemetry System"; U.S. patent application Ser. No. 13/553,958, filed on Jul. 20, 2012, titled "Methods of Evaluating Rock Properties While Drilling Using Downhole Acoustic Sensors and Telemetry System"; U.S. patent application Ser. No. 13/554,470, filed on Jul. 20, 2012, titled "Methods for Evaluating Rock Properties While Drilling Using Drilling Rig-Mounted Acoustic Sensors"; and U.S. patent application Ser. No. 13/554,077, filed on Jul. 20, 2012, titled "Apparatus, Computer Readable Medium, and Program Code for Evaluating Rock Properties While Drilling Using Drilling Downhole Acoustic Sensors and a Downhole Broadband Transmitting System; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011, U.S. Provisional Patent Application No. 61/539,171, titled "Methods Of Evaluating Rock Properties While Drilling Using Downhole Acoustic Sensors And A Downhole Broadband Transmitting System," filed on Sep. 26, 2011; U.S. Provisional Patent Application No. 61/539,242 titled "Apparatus And Program Product For Evaluating Rock Properties While Drilling Using Downhole Acoustic Sensors And Telemetry System," filed on Sep. 26, 2011; and U.S. Provisional Patent Application No. 61/539,246 titled "Methods Of Evaluating Rock Properties While Drilling Using Downhole Acoustic Sensors And Telemetry System," filed on Sep. 26, 2011, each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus for identifying rock properties in real-time during drilling, the apparatus comprising:
   an acoustic signal recording and transmitting system including an acoustic sensor connected to one of the following: (i) a drive shaft of a drill rig, the drive shaft including a plurality of extensions, and (ii) an extension of the plurality of extensions of the drive shaft the drive shaft connected to a drill string, a drill bit connected to the downhole end of the drill string; and
   a computer in communication with one or more components of the acoustic signal recording and transmitting system, the computer configured to perform the following operations:
      receiving an acoustic sensor data signal from the acoustic signal recording and transmitting system, the acoustic sensor data signal representing an acoustic signal generated real-time by the acoustic sensor as a result of rotational contact of the drill bit with rock during drilling, and
   analyzing the acoustic sensor data signal to determine, real-time, at least one of the following: lithology type and one or more petrophysical properties of rock engaged by the drill bit during drilling operations, analyzing the acoustic sensor data signal comprising steps of:
      deriving a plurality of acoustic characteristics from the acoustics sensor data signal, the plurality of acoustic characteristics including mean frequency, mean amplitude, normalized deviation of frequency, normalized deviation of amplitude, and apparent power, and
      correlating the man frequency, the mean amplitude, the normalized deviation of frequency, the normalized deviation of amplitude, and the apparent power with the same types of the acoustic characteristics of a rock sample of known lithology type to identify, in real-time, one or moare of the following: the lithology type and one or more pertrophysical properties of the rock engaged by the drill bit during drilling operations.

2. The apparatus as defined in claim 1, wherein the computer is further configured to perform the following operations:
   deriving a frequency distribution from the acoustic sensor data signal; and
   correlating the frequency distribution of the processed acoustic sensor data signal with a frequency distribution of a rock sample of known lithology type to identify, real-time, the lithology type of rock engaged by the drill bit during drilling operations.

3. The apparatus as defined in claim 1, wherein the computer is further configured to perform the following operations:
   deriving a petrophysical properties evaluation algorithm to predict one or more petrophysical properties of rock engaged by the drill bit during drilling operations;
   encoding the derived petrophysical properties evaluation algorithm in a computer program; and
   employing the computer program encoding the derived petrophysical properties evaluation algorithm to predict the one or more petrophysical properties of rock engaged by the drill bit during drilling operations from the acoustic data contained within the acoustic sensor data signal.

4. The apparatus as defined in claim 1, wherein the acoustic sensor has a built in amplifier.

5. The apparatus as defined in claim 1, wherein the plurality of extensions include a packing box which rotates with the drive shaft, and wherein the acoustic sensor is connected to the packing box to maximally pick up drill sounds of the drill bit engaging rock during drilling operations.

6. The apparatus as defined in claim 1, wherein the acoustic sensor is connected to an outer surface of the drive shaft to maximally pick up drill sounds of the drill bit engaging rock during drilling operations.

7. The apparatus as defined in claim 6, wherein the plurality of extensions includes a rotary manifold operably coupled to and substantially surrounding a portion of the drive shaft, and wherein the acoustic sensor is connected to the outer surface of the drive shaft at a location between the rotary manifold, and a joint connecting the drive shaft to the drill string.

8. The apparatus as defined in claim 1, wherein the plurality of extensions include a packing box which rotates with the drive shaft, wherein the acoustic signal recording and transmitting system includes a plurality of acoustic sensors, and wherein a first of the plurality of acoustic sensors is connected to the packing box and a second of the plurality of acoustic sensors is connected to an outer surface of the drive shaft.

9. The apparatus as defined in claim 1, wherein the plurality of extensions include a packing box which rotates with the drive shaft and an upper bearing cup positioned adjacent the packing box and stationary with respect to the drive shaft, and wherein the acoustic sensor is connected to an upper surface of the upper bearing cup to at least substantially maximally pick up drill sounds of the drill bit engaging rock during drilling operations.

10. The apparatus as defined in claim 1, wherein the plurality of extensions include a rotary manifold, and wherein the acoustic sensor is connected to the rotary manifold to at least substantially maximally pick up drill sounds of the drill bit engaging rock during drilling operations.

11. The apparatus as defined in claim 10, wherein the acoustic sensor is connected to a lower surface of the rotary manifold.

12. The apparatus as defined in claim 1, wherein the plurality of extensions include (i) an upper bearing cup which is stationary with respect to the drive shaft, and (ii) a rotary manifold which is stationary relative to the drive shaft during drilling, wherein the acoustic signal recording and transmitting system includes a plurality of acoustic sensors, and wherein a first of the plurality of acoustic sensors is connected to the upper bearing cup and a second of the plurality of acoustic sensors is connected to the rotary manifold.

13. The apparatus as defined in claim 1,
   wherein the acoustic signal recording and transmitting system comprises an inductive telemetry system;
   wherein the plurality of extensions include a packing box which rotates with the drive shaft;
   wherein the acoustic sensor is connected to the packing box; and
   wherein the inductive telemetry system includes:
      a rotating induction loop encircling a portion of the packing box,
      a stationary pickup configured to receive an acoustic signal from the acoustic sensor through an electromagnetic coupling with the rotating induction loop and to supply electric power to the acoustic sensor via the electromagnetic coupling between the induction loop and the pickup,
      a receiver positioned to receive the acoustic signal from the pickup and to transmit the acoustic signal to a data acquisition unit, and
      the data acquisition unit positioned to receive the acoustic signal from the receiver and configured to sample the received acoustic signal from the receiver and to digitize the sampled acoustic signal and to transmit the digitized acoustic signal to the computer.

14. The apparatus as defined in claim 1,
   wherein the acoustic signal recording and transmitting system comprises an inductive telemetry system;
   wherein the plurality of extensions includes a rotary manifold;
   wherein the acoustic sensor is connected to an outer surface of the drive shaft between the rotary manifold and a joint between the drive shaft and the drill string; and
   wherein the inductive telemetry system includes:
      a rotating induction loop encircling a portion of the drive shaft or a cylindrically shaped rotating component adjacent to the acoustic sensor,
      a stationary pickup configured to receive an acoustic signal from the acoustic sensor through an electromagnetic coupling with the rotating induction loop and to supply electric power to the acoustic sensor via the electromagnetic coupling between the induction loop and the pickup,
      a receiver positioned to receive the acoustic signal from the pickup and to transmit the acoustic signal to a data acquisition unit, and
      the data acquisition unit positioned to receive the acoustic signal from the receiver and configured to sample the received acoustic signal received from the receiver, to digitize the sampled acoustic signal, and to transmit the digitized acoustic signal to the computer.

15. The apparatus as defined in claim 1,
   wherein the acoustic signal recording and transmitting system comprises a wireless telemetry system;
   wherein the plurality of extensions include a packing box which rotates with the drive shaft;
   wherein the acoustic sensor is connected to the packing box; and wherein the wireless telemetry system includes:
- a wireless transmitter operably connected to or integral with the acoustic sensor to thereby define a wireless acoustic sensor, and
- a wireless gateway configured to receive an acoustic signal from the wireless acoustic sensor and to transmit the acoustic signal or a digitized form of the acoustic signal to the computer.

16. The apparatus as defined in claim 15, wherein the wireless telemetry system further includes a data acquisition unit positioned to receive and configured to sample the acoustic signal received from the wireless gateway, to digitize the sampled acoustic signal, and to transmit the digitized acoustic signal to the computer when either the wireless acoustic sensor or the wireless gateway is not configured to perform the function of data digitization.

17. The apparatus as defined in claim 1,
wherein the acoustic signal recording and transmitting system comprises a wireless telemetry system;
wherein the plurality of extensions includes a rotary manifold;
wherein the acoustic sensor is connected to an outer surface of the drive shaft between the rotary manifold and a joint between the drive shaft and the drill string; and
wherein the wireless telemetry system includes:
- a wireless transmitter operably connected to or integral with the acoustic sensor to thereby define a wireless acoustic sensor, and
- a wireless gateway configured to receive an acoustic signal from the wireless acoustic sensor and to transmit the acoustic signal or a digitized form of the acoustic signal to the computer.

18. The apparatus as defined in claim 17, wherein the wireless telemetry system further includes a data acquisition unit positioned to receive and configured to sample the acoustic signal received from the wireless gateway, to digitize the sampled acoustic signal, and to transmit the digitized acoustic signal to the computer when either the wireless acoustic sensor or the wireless gateway is not configured to perform the function of data digitization.

19. The apparatus as defined in claim 1,
wherein the acoustic signal recording and transmitting system comprises a wired transmitting system;
wherein the plurality of extensions include a packing box which rotates with the drive shaft and an upper bearing cup positioned adjacent the packing box and stationary with respect to the drive shaft;
wherein the acoustic sensor is connected to the upper bearing cup; and
wherein the wired transmitting system includes:
- a data acquisition unit configured to sample and digitize acoustic signals received from the acoustic sensor and to send the digitized acoustic signals to the computer, and
- a wire extending between the acoustic sensor and the data acquisition unit, the wire secured inside a service loop of a drill rig supporting the drive shaft.

20. The apparatus as defined in claim 1,
wherein the acoustic signal recording and transmitting system comprises a wired transmitting system;
wherein the plurality of extensions include a rotary manifold which is stationary relative to the drive shaft during drilling;
wherein the acoustic sensor is connected to the rotary manifold; and
wherein the wired transmitting system includes:
- a data acquisition unit configured to sample and digitize acoustic signals received from the acoustic sensor and to send the digitized acoustic signals to the computer, and
- a wire extending between the acoustic sensor and the data acquisition unit, the wire secured inside a service loop of a drill rig supporting the drive shaft.

21. The apparatus for identifying rock properties in real-time during drilling, the apparatus comprising:
a drill string comprising a plurality of drill pipes;
a drill bit connected to the downhole end of the drill string;
a drive shaft connected to the drill string, the drive shaft including a plurality of extensions;
an acoustic signal recording and transmitting system including an acoustic sensor connected to one of the following: (i) the drive shaft, and (ii) an extension of the plurality of extensions of the drive shaft; and
a computer in communication with one or more components of the acoustic signal recording and transmitting system, the computer including a processor, memory in communication with the processor, and petrophysical properties analyzing program, the computer configured to perform the following operations:
receiving an acoustic sensor data signal from the acoustic signal recording and transmitting system, the acoustic sensor data signal representing an acoustic signal generated real-time by the acoustic sensor as a result of rotational contact of the drill bit with rock during drilling,
performing the following processing operations:
deriving a frequency distribution from the acoustic sensor data signal,
deriving a plurality of acoustic characteristics from the acoustic sensor data signal, the plurality of acoustic characteristics including mean frequency, normalized deviation of frequency, mean amplitude, normalized deviation of amplitude, and apparent power, and
deriving a petrophysical properties evaluation algorithm to predict one or more petrophysical properties of rock engaged by the drill bit during drilling operations and encoding the derived petrophysical properties evaluation algorithm into a subroutine for the petrophysical properties analyzing program; and
performing one or more of the following analyzing operations:
correlating the frequency distribution of the processed acoustic sensor data signal with a frequency distribution of a rock sample of known lithology type to identify a lithology type of rock engaged by the drill bit real-time during drilling operations,
correlating the mean frequency, the normalized deviation of frequency, the mean amplitude, the normalized deviation of amplitude, and the apparent power with the same types of the acoustic characteristics of a rock sample of known lithology type to identify, real-time, one or more of the following: (i) the lithology type, and (ii) one or more petrophysical properties, of the rock engaged by the drill bit during drilling operations, and
employing the portion of the petrophysical properties analyzing program encoding the derived petrophysical properties evaluation algorithm to predict the one or more petrophysical properties of rock engaged by the drill bit during drilling operations from the acoustic data contained within the acoustic sensor data signal.

22. The apparatus as defined in claim 21, wherein the plurality of extensions include a packing box which rotates with the drive shaft, and wherein the acoustic sensor is connected to the packing box to at least substantially maximally pick up drill sounds of the drill bit engaging rock during drilling operations.

23. The apparatus as defined in claim 21, wherein the acoustic sensor is connected to an outer surface of the drive shaft to at least substantially maximally pick up drill sounds of the drill bit engaging rock during drilling operations.

24. The apparatus as defined in claim 23, wherein the plurality of extensions includes a rotary manifold operably coupled to and substantially surrounding a portion of the drive shaft, and wherein the acoustic sensor is connected to the outer surface of the drive shaft at a location between the rotary manifold and a joint connecting the drive shaft to the drill string.

25. The apparatus as defined in claim 21, wherein the plurality of extensions include a packing box which rotates with the drive shaft, wherein the acoustic signal recording and transmitting system includes a plurality of acoustic sensors, and wherein a first of the plurality of acoustic sensors is connected to the packing box and a second of the plurality of acoustic sensors is connected to an outer surface of the drive shaft.

26. The apparatus as defined in claim 21, wherein the plurality of extensions include a packing box which rotates with the drive shaft and an upper bearing cup positioned adjacent the packing box and stationary with respect to the drive shaft, and wherein the acoustic sensor is connected to an upper surface of the upper bearing cup to at least substantially maximally pick up drill sounds of the drill bit engaging rock during drilling operations.

27. The apparatus as defined in claim 21, wherein the plurality of extensions include a rotary manifold, and wherein the acoustic sensor is connected to the rotary manifold to at least substantially maximally pick up drill sounds of the drill bit engaging rock during drilling operations.

28. The apparatus as defined in claim 27, wherein the acoustic sensor is connected to a lower surface of the rotary manifold.

29. The apparatus as defined in claim 21, wherein the plurality of extensions include (i) an upper bearing cup which is stationary with respect to the drive shaft, and (ii) a rotary manifold which is stationary relative to the drive shaft during drilling, wherein the acoustic signal recording and transmitting system includes a plurality of acoustic sensors, and wherein a first of the plurality of acoustic sensors is connected to the upper bearing cup and a second of the plurality of acoustic sensors is connected to the rotary manifold.

30. The apparatus as defined in claim 21,
wherein the acoustic signal recording and transmitting system comprises an inductive telemetry system;
wherein the plurality of extensions include a packing box which rotates with the drive shaft;
wherein the acoustic sensor is connected to the packing box; and
wherein the inductive telemetry system includes:
a rotating induction loop encircling a portion of the packing box,
a stationary pickup configured to receive an acoustic signal from the acoustic sensor through an electromagnetic coupling with the rotating induction loop and to supply electric power to the acoustic sensor via the electromagnetic coupling between the induction loop and the pickup,
a receiver positioned to receive the acoustic signal from the pickup and to transmit the acoustic signal to a data acquisition unit, and
the data acquisition unit positioned to sample the received acoustic signal received from the receiver, to digitize the sampled acoustic signal, and to transmit the digitized acoustic signal to the computer.

31. The apparatus as defined in claim 21,
wherein the acoustic signal recording and transmitting system comprises an inductive telemetry system;
wherein the plurality of extensions includes a rotary manifold;
wherein the acoustic sensor is connected to an outer surface of the drive shaft between the rotary manifold and a joint between the drive shaft and the drill string; and
wherein the inductive telemetry system includes:
a rotating induction loop encircling a portion of the drive shaft or a cylindrically shaped rotating component adjacent to the acoustic sensor,
a stationary pickup configured to receive an acoustic signal from the acoustic sensor through an electromagnetic coupling with the rotating induction loop and to supply electric power to the acoustic sensor via the electromagnetic coupling between the induction loop and the pickup,
a receiver positioned to receive the acoustic signal from the pickup and to transmit the acoustic signal to a data acquisition unit, and
the data acquisition unit positioned to sample the received acoustic signal received from the receiver, to digitize the sampled acoustic signal, and to transmit the digitized acoustic signal to the computer.

32. The apparatus as defined in claim 21,
wherein the acoustic signal recording and transmitting system comprises a wireless telemetry system;
wherein the plurality of extensions include a packing box which rotates with the drive shaft;
wherein the acoustic sensor is connected to the packing box; and
wherein the wireless telemetry system includes:
a wireless transmitter operably connected to or integral with the acoustic sensor to thereby define a wireless acoustic sensor, and
a wireless gateway configured to receive an acoustic signal from the wireless acoustic sensor and to transmit the acoustic signal or a digitized form of the acoustic signal to the computer.

33. The apparatus as defined in claim 32, wherein the wireless telemetry system further comprises a data acquisition unit positioned to sample the received acoustic signal and to digitize the sampled acoustic signal and to transmit the digitized acoustic signal to the computer when either the wireless acoustic sensor or the wireless gateway is not configured to perform the function of data digitization.

34. The apparatus as defined in claim 21,
wherein the acoustic signal recording and transmitting system comprises a wireless telemetry system;
wherein the plurality of extensions includes a rotary manifold;
wherein the acoustic sensor is connected to an outer surface of the drive shaft between the rotary manifold and a joint between the drive shaft and the drill string; and wherein the wireless telemetry system includes:
  a wireless transmitter operably connected to or integral with the acoustic sensor to thereby define a wireless acoustic sensor, and
  a wireless gateway configured to receive an acoustic signal from the wireless acoustic sensor and to transmit the acoustic signal or a digitized form of the acoustic signal to the computer.

35. The apparatus as defined in claim 21, wherein the wireless telemetry system further comprises a optional data acquisition unit to sample the received acoustic signal and to digitize the sampled acoustic signal and to transmit the digitized acoustic signal to the computer if either the wireless acoustic sensor or the wireless gateway is not configured to perform the function of data digitization.

36. The apparatus as defined in claim 21,
wherein the acoustic signal recording and transmitting system comprises a wired transmitting system;
wherein the plurality of extensions include a packing box which rotates with the drive shaft and an upper bearing cup positioned adjacent the packing box and stationary with respect to the drive shaft;
wherein the acoustic sensor is connected to the upper bearing cup; and
wherein the wired transmitting system includes:
  a data acquisition unit configured to sample and digitize acoustic signals received from the acoustic sensor and to send the digitized acoustic signals to the computer, and
  a wire extending between the acoustic sensor and the data acquisition unit, the wire secured inside a service loop of a drill rig supporting the drive shaft.

37. The apparatus as defined in claim 21,
wherein the acoustic signal recording and transmitting system comprises a wired transmitting system;
wherein the plurality of extensions include a rotary manifold which is stationary relative to the drive shaft during drilling;
wherein the acoustic sensor is connected to the rotary manifold; and
wherein the wired transmitting system includes:
  a data acquisition unit configured to sample and digitize acoustic signals received from the acoustic sensor and to send the digitized acoustic signals to the computer, and
  a wire extending between the acoustic sensor and the data acquisition unit, the wire secured inside a service loop of a drill rig supporting the drive shaft.

38. An apparatus for identifying rock properties in real-time during drilling, the apparatus comprising:
  a drill string comprising a plurality of drill pipes;
  a drill bit connected to the downhole end of the drill string;
  a drive shaft connected to the drill string, the drive shaft including a plurality of extensions;
  an acoustic signal recording and transmitting system including an acoustic sensor connected to one or more of (i) the drive shaft, and an (ii) an extension of the plurality of extensions of the drive shaft; and
  a computer in communication with one or more components of the acoustic signal recording and transmitting system, the computer including a processor, memory in communication with the processor, and a petrophysical properties analyzing program, the computer configured to perform the following operations;
    receiving an acoustic sensor data signal from the acoustic signal recording and transmitting system, the acoustic sensor data signal representing an acoustic signal generated real-time by the acoustic sensor as a result of rotational contact of the drill bit with rock during drilling,
    deriving a plurality of acoustic characteristics from the acoustic sensor data signal, the plurality of acoustic characteristics including mean frequency, normalized deviation of frequency, mean amplitude, normalized deviation of amplitude, and apparent power, and
    correlating the mean frequency, the normalized deviation of frequency, the mean amplitude, the normalized deviation of amplitude, and the apparent power with the same types of acoustic characteristics of a rock sample of known lithology type to identify, real-time, one or more of the following: (i) the lithology type, and (ii) one or more petrophysical properties of the rock engaged by the drill bit during drilling operations.

39. An apparatus as defined in claim 38, wherein the computer further is configured to perform the following operations:
  deriving a petrophysical properties evaluation algorithm to predict one or more petrophysical properties of rock engaged by the drill bit during drilling operations and encoding the derived petrophysical properties evaluation algorithm into a subroutine for the petrophysical properties analyzing program; and
  employing the portion of the petrophysical properties analyzing program encoding the derived petrophysical properties evaluation algorithm to predict the one or more petrophysical properties of rock engaged by the drill bit during drilling operations from the acoustic data contained within the acoustic sensor data signal.

* * * * *

UNITED STATES PATENT AND TRADEMARK OFFICE
CERTIFICATE OF CORRECTION

PATENT NO. : 9,234,974 B2
APPLICATION NO. : 13/554298
DATED : January 12, 2016
INVENTOR(S) : Yunai Yang It is certified that error appears in the above-identified patent and that said Letters Patent is hereby corrected as shown below:

In the claims

In Column 18, Line 35, Claim 1, the third to last word appears as "shaft" and should read --shaft,--.

In Column 18, Line 55, Claim 1, the first word appears as "acoustics" and should read --acoustic--.

In Column 18, Line 60, Claim 1, the third word appears as "man" and should read --mean--.

In Column 18, Line 65, Claim 1, the fourth word appears as "moare" and should read --more--.

In Column 22, Line 9, Claim 21, the first word appears as "The" and should read --An--.

Signed and Sealed this
Third Day of May, 2016

Michelle K. Lee
*Director of the United States Patent and Trademark Office*